United States Patent
Seok

(10) Patent No.: US 9,742,544 B2
(45) Date of Patent: Aug. 22, 2017

(54) DYNAMIC INTER-FRAME SPACE PROCESSING IN HIGH EFFICIENCY WIRELESS LAN

(71) Applicant: NEWRACOM, INC., Irvine, CA (US)

(72) Inventor: Yongho Seok, Irvine, CA (US)

(73) Assignee: NEWRACOM, INC., Irvine, CA (US)

( * ) Notice: Subject to any disclaimer, the term of this patent is extended or adjusted under 35 U.S.C. 154(b) by 79 days.

(21) Appl. No.: 14/822,601

(22) Filed: Aug. 10, 2015

(65) Prior Publication Data

US 2016/0043855 A1 Feb. 11, 2016

Related U.S. Application Data

(60) Provisional application No. 62/146,906, filed on Apr. 13, 2015.

(30) Foreign Application Priority Data

Aug. 8, 2014 (KR) .................. 10-2014-0102166

(51) Int. Cl.
| | |
|---|---|
| *H04L 5/00* | (2006.01) |
| *H04W 74/08* | (2009.01) |
| *H04L 1/00* | (2006.01) |
| *H04W 84/12* | (2009.01) |

(52) U.S. Cl.
CPC .......... *H04L 5/0055* (2013.01); *H04L 1/0001* (2013.01); *H04L 5/0007* (2013.01); *H04W 74/0816* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 2005/0220145 | A1* | 10/2005 | Nishibayashi | ........ H04W 99/00 370/474 |
| 2006/0034178 | A1* | 2/2006 | Yang | ..................... H04L 1/1607 370/236 |
| 2011/0116401 | A1* | 5/2011 | Banerjea | ........... H04W 74/0816 370/252 |
| 2014/0233478 | A1* | 8/2014 | Wentink | ................ H04L 5/0055 370/329 |

* cited by examiner

*Primary Examiner* — Charles C Jiang
*Assistant Examiner* — Saad Khawar

(57) ABSTRACT

The present invention relates to a transmission and receiving method and apparatus using a dynamically determined Inter-Frame Space (IFS) in a Wireless Local Area Network (WLAN). According to one aspect of the present invention, a method for processing a received frame by a Station (STA) in a WLAN may include receiving a first frame including downlink data for a plurality of STAs, if the received first frame has no error, transmitting a second frame including an ACKnowledgement (ACK) of the STA simultaneously with ACKs of one or more other STAs, and if the received first frame has an error, performing carrier sensing using a variably determined IFS.

14 Claims, 23 Drawing Sheets

FIG. 10

| L-STF | L-LTF | L-SIG | HE-SIG-A | HE-STF | HE-LTF | HE-LTF | HE-LTF | HE-SIG-B | PSDU(AP to STA6) |
| | | | | HE-STF | HE-LTF | HE-LTF | HE-LTF | HE-SIG-B | PSDU(AP to STA5) |
| | | | | HE-STF | HE-LTF | HE-LTF | HE-LTF | HE-SIG-B | PSDU(AP to STA3, STA4) |
| | | | | HE-STF | HE-LTF | HE-LTF | HE-LTF | HE-SIG-B | PSDU(AP to STA1, STA2) |

FIG. 11

| L-STF | L-LTF | L-SIG | HE-SIG-A | HE-STF | HE-LTF | HE-SIG-B | HE-LTF | HE-LTF | HE-LTF | HE-LTF | HE-SIG-C | PSDU(AP to STA6) |
| | | | | HE-STF | HE-LTF | HE-SIG-B | HE-LTF | HE-LTF | HE-LTF | HE-LTF | HE-SIG-C | PSDU(AP to STA5) |
| | | | | HE-STF | HE-LTF | HE-SIG-B | HE-LTF | HE-LTF | HE-LTF | HE-LTF | HE-SIG-C | PSDU(AP to STA3, STA4) |
| | | | | HE-STF | HE-LTF | HE-SIG-B | HE-LTF | HE-LTF | HE-LTF | HE-LTF | HE-SIG-C | PSDU(AP to STA1, STA2) |

| RTS PPDU (AP to STA1) | CTS PPDU (STA1 to AP) | DATA PPDU (AP to STA4) | Block ACK PPDU (STA4 to AP) |
| | | DATA PPDU (AP to STA3) | Block ACK PPDU (STA3 to AP) |
| | | DATA PPDU (AP to STA2) | Block ACK PPDU (STA2 to AP) |
| | | DATA PPDU (AP to STA1) | Block ACK PPDU (STA1 to AP) |

FIG. 16

| RTS PPDU (AP to STA1) | CTS PPDU (STA1 to AP) | DATA PPDU (AP to STA4) | Normal ACK PPDU (STA4 to AP) |
| | | DATA PPDU (AP to STA3) | Normal ACK PPDU (STA3 to AP) |
| | | DATA PPDU (AP to STA2) | Normal ACK PPDU (STA2 to AP) |
| | | DATA PPDU (AP to STA1) | Normal ACK PPDU (STA1 to AP) |

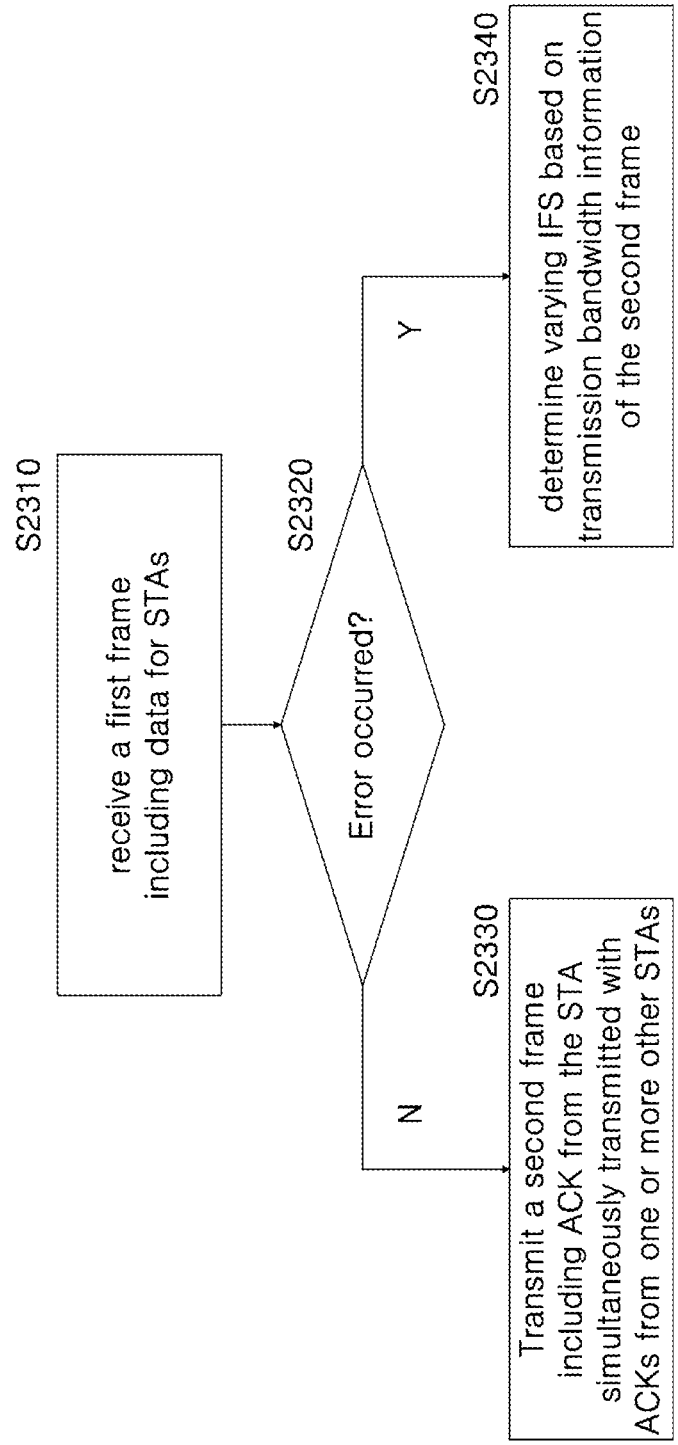

DYNAMIC INTER-FRAME SPACE PROCESSING IN HIGH EFFICIENCY WIRELESS LAN

This application claims the benefit of U.S. Provisional Application No. 62/146,906, filed on Apr. 13, 2015, which is hereby incorporated by reference as if fully set forth herein. This application claims the benefit of Korean Patent Application No. 10-2014-0102166, filed on Aug. 8, 2014, which is hereby incorporated by reference as if fully set forth herein.

BACKGROUND OF THE INVENTION

Field of the Invention

The present invention relates to a Wireless Local Area Network (WLAN), and more particularly, to processing using an Inter-Frame Space (IFS) which is dynamically determined in a High Efficiency WLAN (HEW), a transmitting method, receiving method, transmitting apparatus, receiving apparatus, and software using the processing, and a recording medium that stores the software.

Discussion of the Related Art

Along with the recent development of information and telecommunication technology, various wireless communication techniques have been developed. Among them, the WLAN enables a user to wirelessly access the Internet based on radio frequency technology in a home, an office, or a specific service area using a portable terminal such as a Personal Digital Assistant (PDA), a laptop computer, a Portable Multimedia Player (PMP), a smartphone, etc.

To overcome limitations in communication speed that the WLAN faces, the recent technical standards have introduced a system that increases the speed, reliability, and coverage of a wireless network. For example, the Institute of Electrical and Electronics Engineers (IEEE) 802.11n standard has introduced Multiple Input Multiple Output (MIMO) that is implemented using multiple antennas at both a transmitter and a receiver in order to support High Throughput (HT) at a data processing rate of up to 540 Mbps, minimize transmission errors, and optimize data rates.

SUMMARY OF THE INVENTION

Objects of the present invention is to provide a method and apparatus for dynamically determining an Inter-Frame Space (IFS) based on the transmission bandwidth of a response frame transmitted in response to a received data frame in a High Efficiency WLAN (HEW).

The objects of the present invention are not limited to the foregoing descriptions, and additional objects will become apparent to those having ordinary skill in the pertinent art to the present invention based upon the following descriptions.

In an aspect of the present invention, a method for processing a received frame by a Station (STA) in a WLAN may be provided. The method may include receiving a first frame including downlink data for a plurality of STAs, if no error occurs in the received first frame, transmitting a second frame including an ACKnowledgement (ACK) of the STA, the ACK of the STA being transmitted simultaneously with ACKs of one or more other STAs, and if an error occurs in the received first frame, performing carrier sensing using a variably determined IFS.

In another aspect of the present invention, an STA apparatus for processing a received frame in a WLAN may be provided. The STA apparatus may include a baseband processor, a Radio Frequency (RF) transceiver, a memory, etc. The baseband processor may be configured to receive a first frame including downlink data for a plurality of STAs using the RF transceiver, to transmit, if no error occurs in the received first frame, a second frame including an ACK of the STA, the ACK of the STA being transmitted simultaneously with ACKs of one or more other STAs, using the RF transceiver, and to perform, if no error occurs in the received first frame, carrier sensing using a variably determined IFS.

In another aspect of the present invention, a software or computer-readable medium having instructions executable for an STA to process a received frame in a WLAN may be provided. The executable instructions may operate the STA to receive a first frame including downlink data for a plurality of STAs, to transmit, if no error occurs in the received first frame, a second frame including an ACK of the STA, the ACK of the STA being transmitted simultaneously with ACKs of one or more other STAs, and to perform, if an error occurs in the received first frame, carrier sensing using a variably determined IFS.

In another aspect of the present invention, a method for transmitting a frame by an Access Point (AP) in a WLAN may be provided. The method may include transmitting a first frame for one or more STAs on one or more transmission channels including a primary channel, and receiving a second frame from the one or more STAs on one or more subchannels allocated for transmission of the second frame in each of the one or more transmission channels. The first frame may be a trigger frame eliciting the second frame, and the one or more subchannels allocated for transmission of the second frame may be included in the primary channel.

In another aspect of the present invention, an AP apparatus for transmitting a frame in a WLAN may be provided. The AP apparatus may include a baseband processor, an RF transceiver, a memory, etc. The baseband processor may be configured to transmit a first frame for one or more STAs on one or more transmission channels including a primary channel using the RF transceiver, and to receive a second frame from the one or more STAs on one or more subchannels allocated for transmission of the second frame in each of the one or more transmission channels using the RF transceiver. The first frame may be a trigger frame eliciting the second frame, and the one or more subchannels allocated for transmission of the second frame may be included in the primary channel.

In another aspect of the present invention, a software or computer-readable medium having instructions executable for an AP to transmit a frame in a WLAN may be provided. The executable instructions may operate the AP to transmit a first frame for one or more STAs on one or more transmission channels including a primary channel, and to receive a second frame from the one or more STAs on one or more subchannels allocated for transmission of the second frame in each of the one or more transmission channels. The first frame may be a trigger frame eliciting the second frame, and the one or more subchannels allocated for transmission of the second frame may be included in the primary channel.

It is to be understood that both the foregoing summarized features are exemplary aspects of the following detailed description of the present invention without limiting the scope of the present invention.

According to the present invention, a method and apparatus for dynamically determining an IFS based on the transmission bandwidth of a response frame transmitted in response to a received data frame in a HEW can be provided.

The advantages of the present invention are not limited to the foregoing descriptions, and additional advantages will become apparent to those having ordinary skill in the pertinent art to the present invention based upon the following descriptions.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 10 depicts the starting and ending points of an High Efficiency Long Training Field (HE-LTF) field in a HE PPDU frame format according to the present invention;

FIG. 11 depicts a High Efficiency SIGnal B (HE-SIG-B) field and a High Efficiency SIGnal C (HE-SIG-C) field in the HE PPDU frame format according to the present invention;

FIG. 12 depicts another exemplary HE PPDU frame format according to the present invention;

FIG. 15 depicts an exemplary ACK procedure performed in response to a DL MU transmission according to the present invention;

FIG. 16 depicts another exemplary ACK procedure performed in response to a DL MU transmission according to the present invention;

FIG. 23 is a flowchart illustrating an exemplary method according to the present invention.

DETAILED DESCRIPTION OF THE INVENTION

Figure 1:
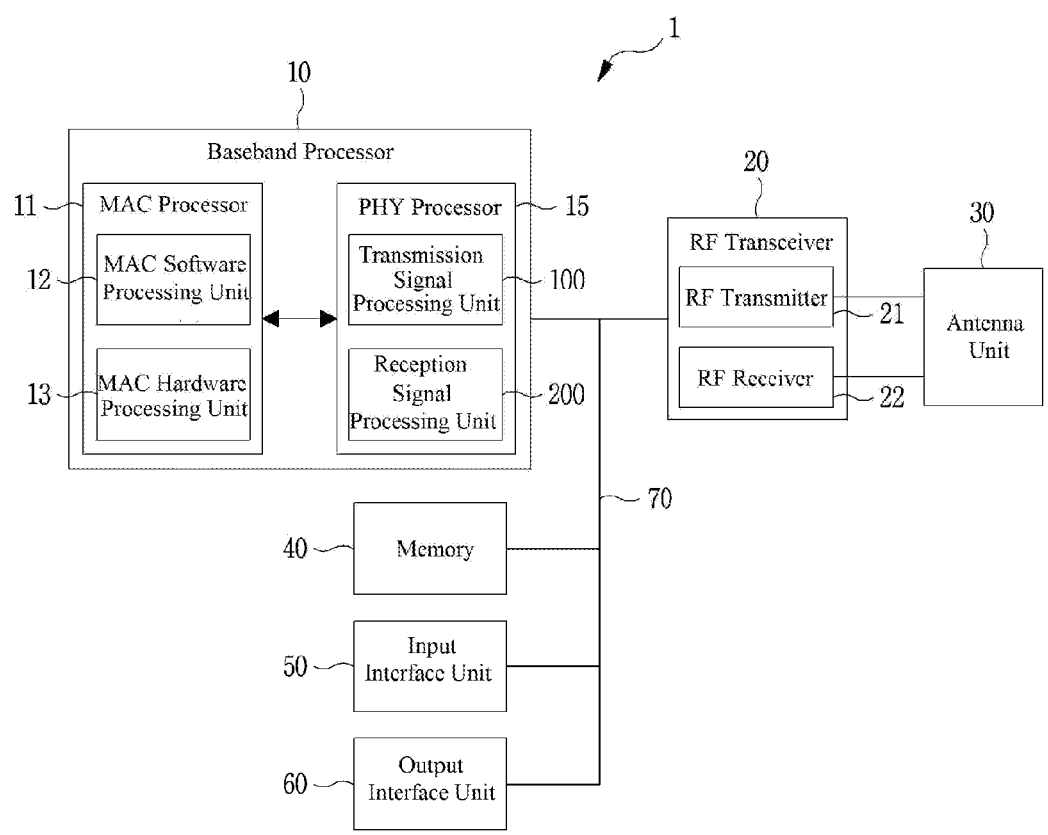
FIG. 1 is a block diagram of a Wireless Local Area Network (WLAN) device.

In the following detailed description, only certain embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In a Wireless Local Area network (WLAN), a Basic Service Set (BSS) includes a plurality of WLAN devices. A WLAN device may include a Medium Access Control (MAC) layer and a PHYsical (PHY) layer according to Institute of Electrical and Electronics Engineers (IEEE) 802.11 series standards. In the plurality of WLAN devices, at least one the WLAN device may be an Access Point (AP) and the other WLAN devices may be non-AP Stations (non-AP STAs). Alternatively, all of the plurality of WLAN devices may be non-AP STAs in an ad-hoc networking environment. In general, AP STA and non-AP STA may be each referred to as a STA or may be collectively referred to as STAs. However, for ease of description herein, only the non-AP STAs may be referred to herein as the STAs.

FIG. 1 is a block diagram of a WLAN device.

Referring to FIG. 1, a WLAN device 1 includes a baseband processor 10, a Radio Frequency (RF) transceiver 20, an antenna unit 30, a memory 40, an input interface unit 50, an output interface unit 60, and a bus 70.

The baseband processor 10 may be simply referred to as a processor, performs baseband signal processing described in the present specification, and includes a MAC processor (or MAC entity) 11 and a PHY processor (or PHY entity) 15.

In an embodiment of the present invention, the MAC processor 11 may include a MAC software processing unit 12 and a MAC hardware processing unit 13. The memory 40 may store software (hereinafter referred to as 'MAC software') including at least some functions of the MAC layer. The MAC software processing unit 12 may execute the MAC software to implement some functions of the MAC layer, and the MAC hardware processing unit 13 may implement the remaining functions of the MAC layer in hardware (hereinafter referred to as 'MAC hardware'). However, the MAC processor 11 is not limited to the foregoing implementation examples.

The PHY processor 15 includes a transmitting (TX) signal processing unit 100 and a receiving (RX) signal processing unit 200.

The baseband processor 10, the memory 40, the input interface unit 50, and the output interface unit 60 may communicate with one another via the bus 70.

The RF transceiver 20 includes an RF transmitter 21 and an RF receiver 22.

The memory 40 may further store an Operating System (OS) and applications. The input interface unit 50 receives information from a user, and the output interface unit 60 outputs information to the user.

The antenna unit 30 includes one or more antennas. When Multiple input Multiple Output (MIMO) or Multi-User MIMO (MU-MIMO) is used, the antenna unit 30 may include a plurality of antennas.

Figure 2:
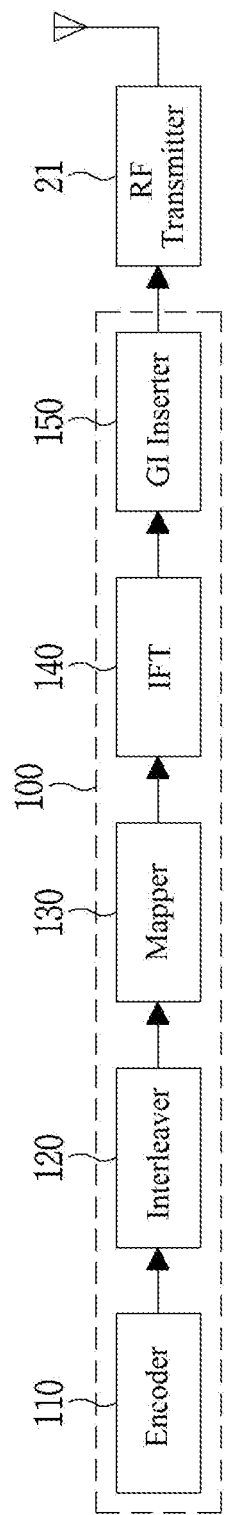
FIG. 2 is a schematic block diagram of an exemplary transmitting signal processing unit in a WLAN.

FIG. 2 is a schematic block diagram of an exemplary transmission signal processor in a WLAN.

Referring to FIG. 2, the transmitting signal processing unit 100 may include an encoder 110, an interleaver 120, a mapper 130, an Inverse Fourier Transformer (IFT) 140, and a Guard Interval (GI) inserter 150.

The encoder 110 encodes input data. For example, the encoder 110 may be a Forward Error Correction (FEC) encoder. The FEC encoder may include a Binary Convolutional Code (BCC) encoder followed by a puncturing device, or the FEC encoder may include a Low-Density Parity-Check (LDPC) encoder.

The transmitting signal processing unit 100 may further include a scrambler for scrambling the input data before encoding to reduce the probability of long sequences of 0s or 1s. If BCC encoding is used in the encoder 110, the transmitting signal processing unit 100 may further include an encoder parser for demultiplexing the scrambled bits among a plurality of BCC encoders. If LDPC encoding is used in the encoder 110, the transmitting signal processing unit 100 may not use the encoder parser.

The interleaver 120 interleaves the bits of each stream output from the encoder 110 to change the order of bits. Interleaving may be applied only when BCC encoding is used in the encoder 110. The mapper 130 maps the sequence of bits output from the interleaver 120 to constellation points. If LDPC encoding is used in the encoder 110, the mapper 130 may further perform LDPC tone mapping in addition to constellation mapping.

When MIMO or MU-MIMO is used, the transmitting signal processing unit 100 may use a plurality of interleavers 120 and a plurality of mappers 130 corresponding to the number of spatial streams, $N_{SS}$. In this case, the transmitting signal processing unit 100 may further include a stream parser for dividing outputs of the BCC encoders or output of the LDPC encoder into blocks that are sent to different interleavers 120 or mappers 130. The transmitting signal processing unit 100 may further include a Space-Time Block Code (STBC) encoder for spreading the constellation points from the $N_{SS}$ spatial streams into $N_{STS}$ space-time streams and a spatial mapper for mapping the space-time streams to transmit chains. The spatial mapper may use direct mapping, spatial expansion, or beamforming The IFT 140 converts a block of constellation points output from the mapper 130 or the spatial mapper to a time-domain block (i.e., a symbol) by using Inverse Discrete Fourier Transform (IDFT) or Inverse Fast Fourier Transform (IFFT). If the STBC encoder and the spatial mapper are used, the IFT 140 may be provided for each transmit chain.

When MIMO or MU-MIMO is used, the transmitting signal processing unit 100 may insert Cyclic Shift Diversities (CSDs) to prevent unintentional beamforming The CSD insertion may occur before or after IFT. The CSD may be specified per transmit chain or may be specified per space-time stream. Alternatively, the CSD may be applied as a part of the spatial mapper.

When MU-MIMO is used, some blocks before the spatial mapper may be provided for each user.

The GI inserter 150 prepends a GI to the symbol. The transmitting signal processing unit 100 may optionally perform windowing to smooth edges of each symbol after inserting the GI. The RF transmitter 21 converts the symbols into an RF signal and transmits the RF signal via the antenna unit 30. When MIMO or MU-MIMO is used, the GI inserter 150 and the RF transmitter 21 may be provided for each transmit chain.

Figure 3:
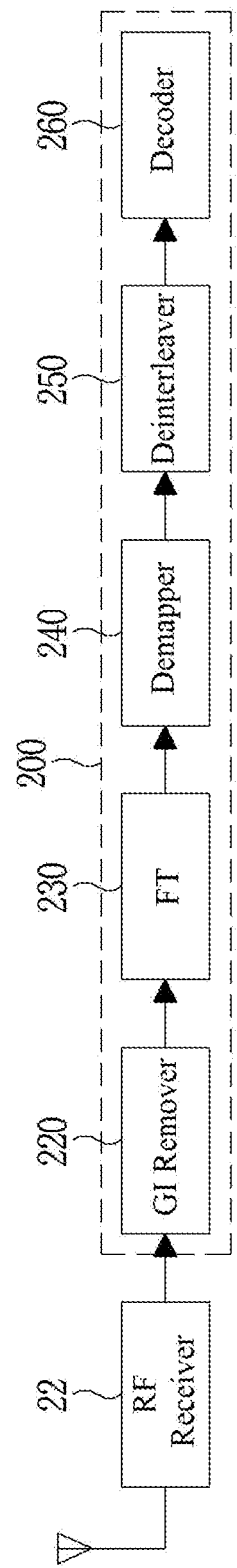
FIG. 3 is a schematic block diagram of an exemplary receiving signal processing unit in a WLAN.

FIG. 3 is a schematic block diagram of an exemplary a receiving signal processor in a WLAN.

Referring to FIG. 3, the receiving signal processing unit 200 includes a GI remover 220, a Fourier Transformer (FT) 230, a demapper 240, a deinterleaver 250, and a decoder 260.

An RF receiver 22 receives an RF signal via the antenna unit 30 and converts the RF signal into symbols. The GI remover 220 removes the GI from the symbol. When MIMO or MU-MIMO is used, the RF receiver 22 and the GI remover 220 may be provided for each receive chain.

The FT 230 converts the symbol (i.e., the time-domain block) into a block of constellation points by using a Discrete Fourier Transform (DFT) or a Fast Fourier Transform (FFT). The FT 230 may be provided for each receive chain.

When MIMO or MU-MIMO is used, the receiving signal processing unit 200 may include a spatial demapper for converting Fourier Transformed receiver chains to constellation points of the space-time streams, and an STBC decoder for despreading the constellation points from the space-time streams into the spatial streams.

The demapper 240 demaps the constellation points output from the FT 230 or the STBC decoder to bit streams. If LDPC encoding is applied to the received signal, the demapper 240 may further perform LDPC tone demapping before constellation demapping. The deinterleaver 250 deinterleaves the bits of each stream output from the demapper 240. Deinterleaving may be applied only when a BCC encoding scheme is applied to the received signal.

When MIMO or MU-MIMO is used, the receiving signal processing unit 200 may use a plurality of demappers 240 and a plurality of deinterleavers 250 corresponding to the number of spatial streams. In this case, the receiving signal processing unit 200 may further include a stream deparser for combining streams output from the deinterleavers 250.

The decoder 260 decodes the streams output from the deinterleaver 250 or the stream deparser. For example, the decoder 100 may be an FEC decoder. The FEC decoder may include a BCC decoder or an LDPC decoder. The receiving signal processing unit 200 may further include a descrambler for descrambling the decoded data. If BCC decoding is used in the decoder 260, the receiving signal processing unit 200 may further include an encoder deparser for multiplexing the data decoded by a plurality of BCC decoders. If LDPC decoding is used in the decoder 260, the receiving signal processing unit 200 may not use the encoder deparser.

In a WLAN system, Carrier Sense Multiple Access with Collision Avoidance (CSMA/CA) is a basic MAC access mechanism. The CSMA/CA mechanism is referred to as Distributed Coordination Function (DCF) of IEEE 802.11 MAC, shortly as a 'listen before talk' access mechanism. According to the CSMA/CA mechanism, an AP and/or a STA may sense a medium or a channel for a predetermined time before starting transmission, that is, may perform Clear Channel Assessment (CCA). If the AP or the STA determines that the medium or channel is idle, it may start to transmit a frame on the medium or channel. On the other hand, if the AP and/or the STA determines that the medium or channel is occupied or busy, it may set a delay period (e.g., a random backoff period), wait for the delay period without starting transmission, and then attempt to transmit a frame. By applying a random backoff period, a plurality of STAs are expected to attempt frame transmission after waiting for different time periods, resulting in minimizing collisions.

Figure 4:
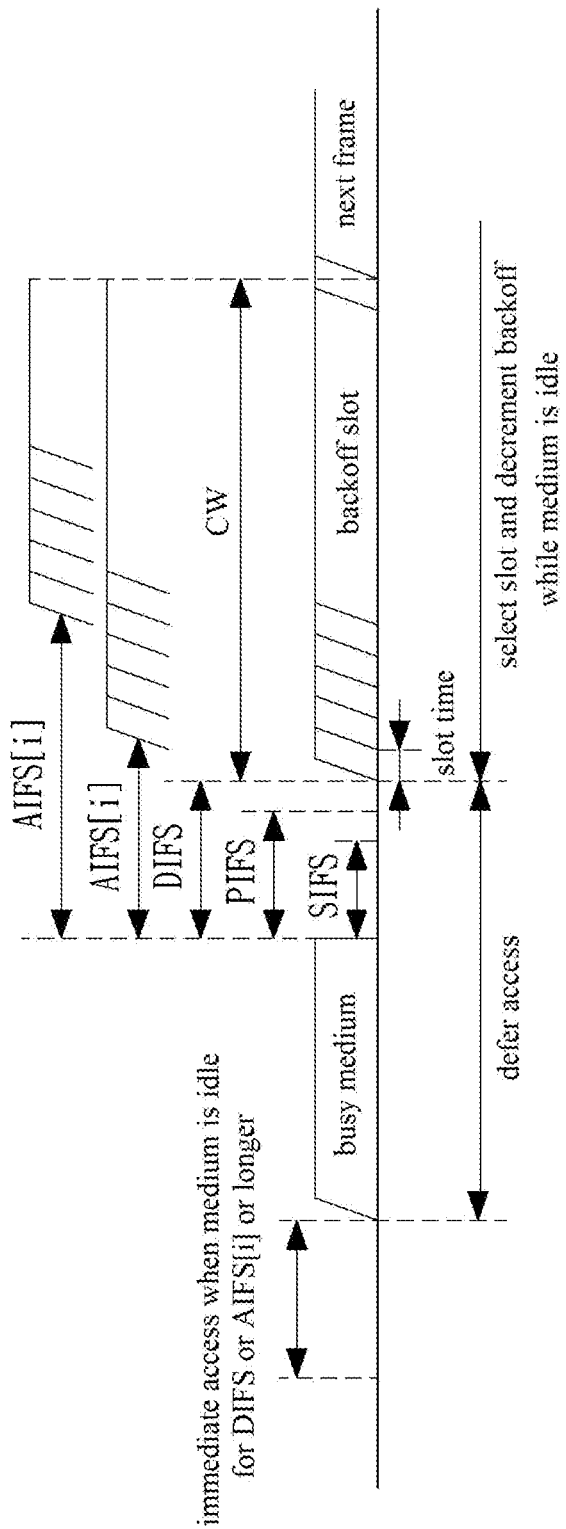
FIG. 4 depicts a relationship between InterFrame Spaces (IFSs)

FIG. 4 depicts a relationship between InterFrame Spaces (IFSs).

WLAN devices may exchange data frames, control frames, and management frames with each other.

A data frame is used for transmission of data forwarded to a higher layer. The WLAN device transmits the data frame after performing backoff if a Distributed Coordination Function IFS (DIFS) has elapsed from a time when the medium has been idle. A management frame is used for exchanging management information which is not forwarded to the higher layer. The WLAN device transmits the management frame after performing backoff if an IFS such as the DIFS or a Point Coordination Function IFS (PIFS) has elapsed. Subtype frames of the management frame include a beacon frame, an association request/response frame, a probe request/response frame, and an authentication request/response frame. A control frame is used for controlling access to the medium. Subtype frames of the control frame include a Request-To-Send (RTS) frame, a Clear-To-Send (CTS) frame, and an ACKnowledgement (ACK) frame. In the case that the control frame is not a response frame to another frame, the WLAN device transmits the control frame after performing backoff if the DIFS has elapsed. In case that the control frame is a response frame to another frame, the WLAN device transmits the control frame without performing backoff if a Short IFS (SIFS) has elapsed. The type and subtype of a frame may be identified by a type field and a subtype field in a Frame Control (FC) field.

On the other hand, a Quality of Service (QoS) STA transmits a frame after performing backoff if an Arbitration IFS (AIFS) for an associated Access Category (AC), i.e., AIFS[i] (i is determined based on AC) has elapsed. In this case, the AIFC[i] may be used for a data frame, a management frame, or a control frame that is not a response frame.

In the example illustrated in FIG. 4, upon generation of a frame to be transmitted, a STA may transmit the frame immediately, if it determines that the medium is idle for the DIFS or AIFS[i] or longer. The medium is busy for a time period during which the STA transmits the frame. During the time period, upon generation of a frame to be transmitted, another STA may defer access by confirming that the medium is busy. If the medium gets idle, the STA that intends to transmit the frame may perform a backoff operation after a predetermined IFS in order to minimize collision with any other STA. Specifically, the STA that intends to transmit the frame selects a random backoff count, waits for a slot time corresponding to the selected random backoff count, and then attempt transmission. The random backoff count is determined based on a Contention Window (CW) parameter and the medium is monitored continuously during count-down of backoff slots (i.e. decrement a backoff count-down) according to the determined backoff count. If the STA monitors the medium as busy, the STA discontinues the count-down and waits, and then, if the medium gets idle, the STA resumes the count-down. If the backoff slot count reaches 0, the STA may transmit the next frame.

Figure 5:
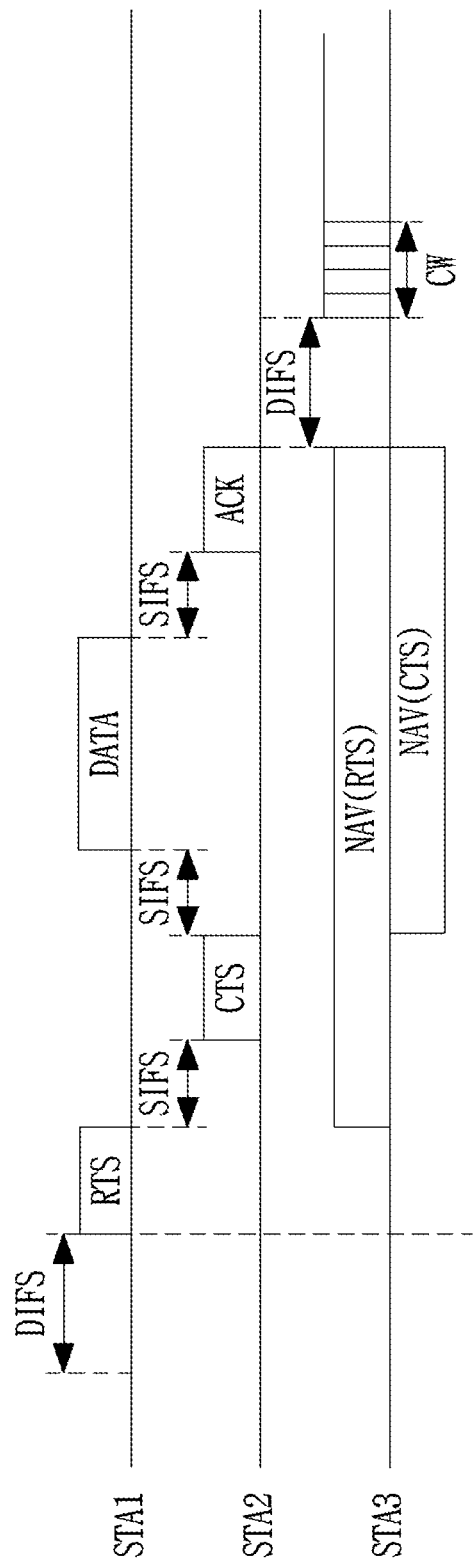
FIG. 5 is a conceptual diagram illustrating a procedure for transmitting a frame in Carrier Sense Multiple Access with Collision Avoidance (CSMA/CA) for avoiding collisions between frames in a channel.

FIG. 5 is a conceptual diagram illustrating a CSMA/CA-based frame transmission procedure for avoiding collisions between frames in a channel.

Referring FIG. 5, a first STA (STA1) is a transmit WLAN device for transmitting data, a second STA (STA2) is a receive WLAN device for receiving the data from STA1, and a third STA (STA3) is a WLAN device which may be located in an area where a frame transmitted from STA1 and/or a frame transmitted from STA2 can be received by STA3.

STA1 may determine whether the channel is busy by carrier sensing. The STA1 may determine the channel occupation based on an energy level on the channel or correlation of signals in the channel, or may determine the channel occupation by using a Network Allocation Vector (NAV) timer.

After determining that the channel is not being used by other devices during DIFS (that is, the channel is idle), STA1 may transmit an RTS frame to STA2 after performing backoff. Upon receiving the RTS frame, STA2 may transmit a CTS frame as a response to the CTS frame after SIFS.

When STA3 receives the RTS frame, STA3 may set the NAV timer for a transmission duration of subsequently transmitted frame by using duration information included in the RTS frame. For example, the NAV timer may be set for a duration of SIFS+CTS frame duration+SIFS+data frame duration+SIFS+ACK frame duration. When STA3 receives the CTS frame, it may set the NAV timer for a transmission duration of subsequently transmitted frames by using duration information included in the CTS frame. For example, the NAV timer may be set for a duration of SIFS+a data frame duration+SIFS+an ACK frame duration. Upon receiving a new frame before the NAV timer expires, STA3 may update the NAV timer by using duration information included in the new frame. STA3 does not attempt to access the channel until the NAV timer expires.

When STA1 receives the CTS frame from STA2, it may transmit a data frame to STA2 after SIFS elapsed from the CTS frame has been completely received. Upon successfully receiving the data frame, STA2 may transmit an ACK frame as a response to the data frame after SIFS elapsed.

When the NAV timer expires, STA3 may determine whether the channel is busy through the use of carrier sensing. Upon determining that the channel is not in use by other devices during DIFS and after the NAV timer has expired, STA3 may attempt channel access after a contention window after a random backoff has elapsed.

Figure 6:
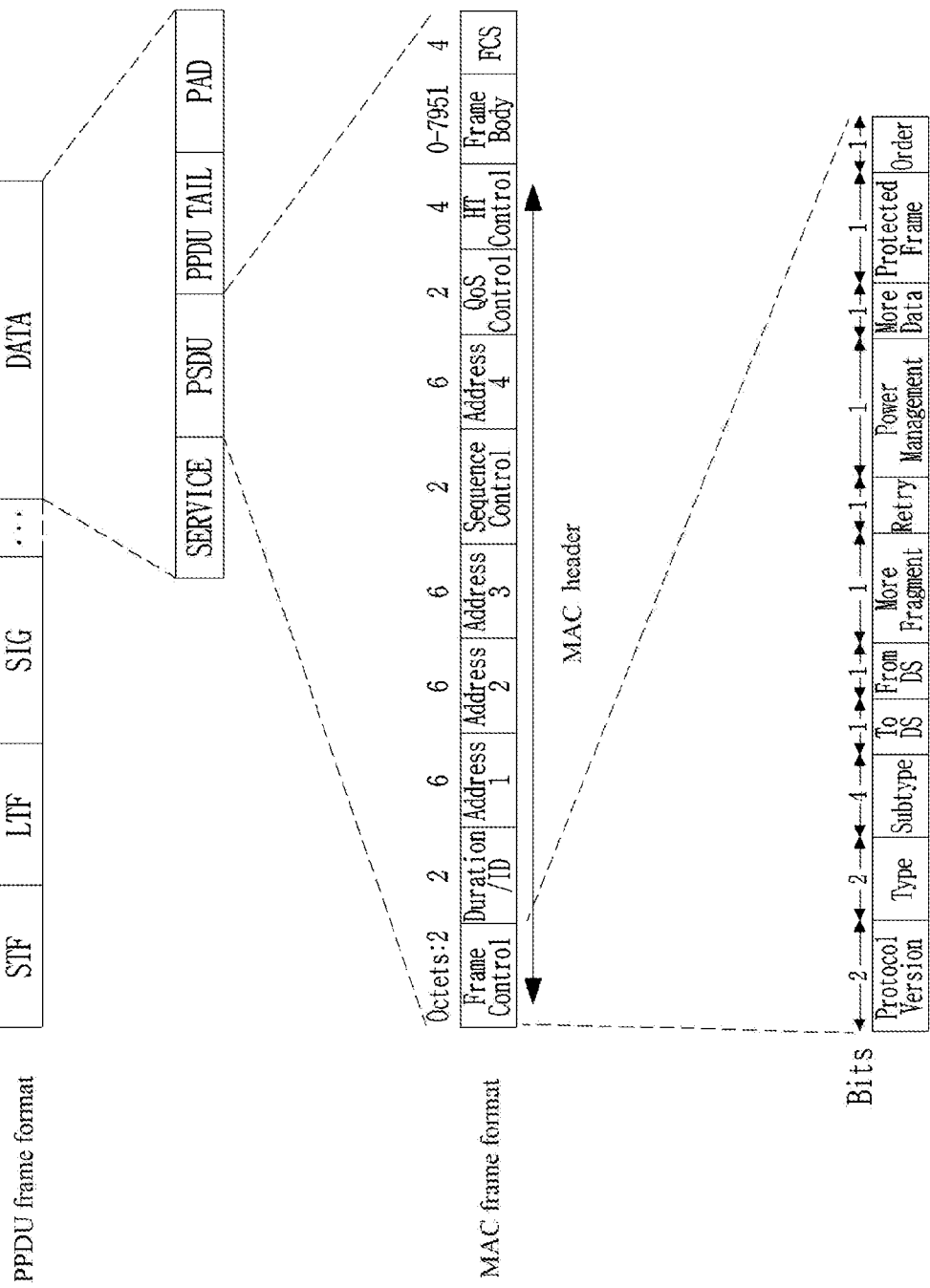
FIG. 6 depicts an exemplary frame structure in a WLAN system.

FIG. 6 depicts an exemplary frame structure in a WLAN system.

PHY layer may prepare a transmission MAC PDU (MPDU) in response to an instruction (or a primitive, which is a set of instructions or a set of parameters) by the MAC layer. For example, upon receipt of an instruction requesting transmission start from the MAC layer, the PHY layer may switch to a transmission mode, construct a frame with information (e.g., data) received from the MAC layer, and transmit the frame.

Upon detection of a valid preamble in a received frame, the PHY layer monitors a header of the preamble and transmits an instruction indicating reception start of the PHY layer to the MAC layer.

Information is transmitted and received in frames in the WLAN system. For this purpose, a Physical layer Protocol Data Unit (PPDU) frame format is defined.

A PPDU frame may include a Short Training Field (STF) field, a Long Training Field (LTF) field, a SIGNAL (SIG) field, and a Data field. The most basic (e.g., a non-High Throughput (non-HT)) PPDU frame may include only a Legacy-STF (L-STF) field, a Legacy-LTF (L-LTF) field, a SIG field, and a Data field. Additional (or other types of) STF, LTF, and SIG fields may be included between the SIG field and the Data field according to the type of a PPDU frame format (e.g., an HT-mixed format PPDU, an HT-greenfield format PPDU, a Very High Throughput (VHT) PPDU, etc.).

The STF is used for signal detection, Automatic Gain Control (AGC), diversity selection, fine time synchronization, etc. The LTF field is used for channel estimation, frequency error estimation, etc. The STF and the LTF fields may be referred to as signals for OFDM PHY layer synchronization and channel estimation.

The SIG field may include a RATE field and a LENGTH field. The RATE field may include information about a modulation scheme and coding rate of data. The LENGTH field may include information about the length of the data. The SIG field may further include parity bits, SIG TAIL bits, etc.

The Data field may include a SERVICE field, a Physical layer Service Data Unit (PSDU), and PPDU TAIL bits. When needed, the Data field may further include padding bits. A part of the bits of the SERVICE field may be used for synchronization at a descrambler of a receiver. The PSDU corresponds to a MAC PDU defined at the MAC layer and may include data generated/used in a higher layer. The PPDU TAIL bits may be used to return an encoder to a zero state. The padding bits may be used to match the length of the Data filed in predetermined units.

A MAC PDU is defined according to various MAC frame formats. A basic MAC frame includes a MAC header, a frame body, and a Frame Check Sequence (FCS). The MAC frame includes a MAC PDU and may be transmitted and received in the PSDU of the data part in the PPDU frame format.

The MAC header includes a Frame Control field, a Duration/Identifier (ID) field, an Address field, etc. The Frame Control field may include control information required for frame transmission/reception. The Duration/ID field may be set to a time for transmitting the frame. For details of Sequence Control, QoS Control, and HT Control subfields of the MAC header, refer to the IEEE 802.11-2012 technical specification.

The Frame Control field of the MAC header may include Protocol Version, Type, Subtype, To DS, From DS, More Fragment, Retry, Power Management, More Data, Protected Frame, and Order subfields. For the contents of each subfield in the Frame Control field, refer to the IEEE 802.11-2012 technical specification.

A Null-Data Packet (NDP) frame format is a frame format that does not include a data packet. In other words, the NDP frame format includes only a Physical Layer Convergence Protocol (PLCP) header part (i.e., the STF, LTF, and SIG fields) of the general PPDU frame format, without the remaining part (i.e., the Data field) of the general PPDU frame format. The NDP frame format may be referred to as a short frame format.

The IEEE 802.11ax task group is discussing a WLAN system, called a High Efficiency WLAN (HEW) system, that operates in 2.4 GHz or 5 GHz and supports a channel bandwidth (or channel width) of 20 MHz, 40 MHz, 80 MHz, or 160 MHz. The present invention defines a new PPDU frame format for the IEEE 802.11ax HEW system. The new PPDU frame format may support MU-MIMO or OFDMA. A PPDU of the new format may be referred to as a 'HEW PPDU' or 'HE PPDU' (similarly, HEW xyz may be referred to as 'HE xyz' or 'HE-xyz' in the following descriptions).

In present specification, the term 'MU-MIMO or OFDMA mode' includes MU-MIMO without using OFDMA, or OFDMA mode without using MU-MIMO in an orthogonal frequency resource, or OFDMA mode using MU-MIMO in an orthogonal frequency resource.

Figure 7:
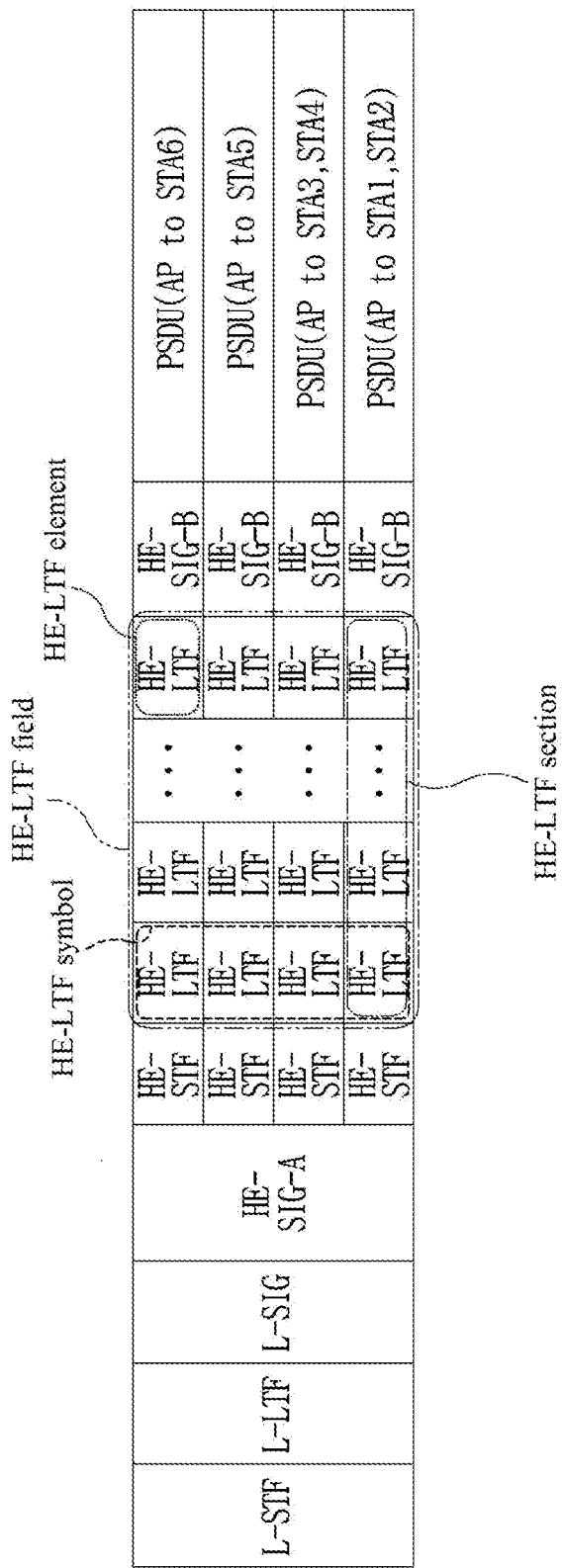
FIG. 7 depicts an exemplary High Efficiency (HE) Physical layer Protocol Data Unit (PPDU) frame format according to the present invention.

FIG. 7 depicts an exemplary HE PPDU frame format according to the present invention.

Referring to FIG. 7, the vertical axis represents frequency and the horizontal axis represents time. It is assumed that frequency and time increase in the upward direction and the right direction, respectively.

In the example of FIG. 7, one channel includes four subchannels. An L-STF, an L-LTF, an L-SIG, and an HE-SIG-A may be transmitted per channel (e.g., 20 MHz), a HE-STF and a HE-LTF may be transmitted on each subchannel being a basic subchannel unit (e.g., 5 MHz), and a HE-SIG-B and a PSDU may be transmitted on each of subchannels allocated to a STA. A subchannel allocated to a STA may have a size required for PSDU transmission to the STA. The size of the subchannel allocated to the STA may be N (N=1, 2, 3, . . . ) times as large as the size of basic subchannel unit (i.e., a subchannel having a minimum size). In the example of FIG. 7, the size of a subchannel allocated to each STA is equal to the size of the basic subchannel unit. For example, a first subchannel may be allocated for PSDU transmission from an AP to STA1 and STA2, a second subchannel may be allocated for PSDU transmission from the AP to STA3 and STA4, a third subchannel may be allocated for PSDU transmission from the AP to STA5, and a fourth subchannel may be allocated for PSDU transmission from the AP to STA6.

While the term subchannel is used in the present disclosure, the term subchannel may be referred to as Resource Unit (RU) or subband. In particular, the terms like OFDMA subchannel, OFDMA RU, OFDMA subband can be used in embodiments for OFDMA in the present disclosure. Terms like a bandwidth of a subchannel, a number of tones (or subcarriers) allocated to a subchannel, a number of data tones (or data subcarriers) allocated to a subchannel can be used to express a size of a subchannel. A subchannel refers to a frequency band allocated to a STA and a basic subchannel unit refers to a basic unit used to represent the size of a subchannel. While the size of the basic subchannel unit is 5 MHz in the above example, this is purely exemplary. Thus, the basic subchannel unit may have a size of 2.5 MHz.

In FIG. 7, a plurality of HE-LTF elements are distinguished in the time and frequency domains. One HE-LTF element may correspond to one OFDM symbol in time domain and one subchannel unit (i.e., a subchannel bandwidth allocated to a STA) in frequency domain. The HE-LTF elements should be understood as logical units and the PHY layer does not necessarily operate in units of an HE-LTF element. In the following description, a HE-LTF element may be referred to shortly as a HE-LTF.

A HE-LTF symbol may correspond to a set of HE-LTF elements in one OFDM symbol in time domain and in one channel unit (e.g., 20 MHz) in frequency domain.

A HE-LTF section may correspond to a set of HE-LTF elements in one or more OFDM symbols in time domain and in one subchannel unit (i.e., a subchannel bandwidth allocated to a STA) in frequency domain.

A HE-LTF field may be a set of HE-LTF elements, HE-LTF symbols, or HE-LTF sections for a plurality of stations.

The L-STF field is used for frequency offset estimation and phase offset estimation, for preamble decoding at a legacy STA (i.e., a STA operating in a system such as IEEE 802.11a/b/g/n/ac). The L-LTF field is used for channel estimation, for the preamble decoding at the legacy STA. The L-SIG field is used for the preamble decoding at the legacy STA and provides a protection function for PPDU transmission of a third-party STA (e.g., setting a NAV based on the value of a LENGTH field included in the L-SIG field).

HE-SIG-A (or HEW SIG-A) represents High Efficiency Signal A (or High Efficiency WLAN Signal A), and includes HE PPDU (or HEW PPDU) modulation parameters, etc. for HE preamble (or HEW preamble) decoding at a HE STA (or HEW STA). The parameters set included in the HEW SIG-A field may include one or more of Very High Throughput (VHT) PPDU modulation parameters transmitted by IEEE 802.11ac stations, as listed in [Table 1] below, to ensure backward compatibility with legacy STAs (e.g., IEEE 802.11ac stations).

TABLE 1

| Two parts of VHT-SIG-A | Bit | Field | Number of bits | Description |
|---|---|---|---|---|
| VHT-SIG-A1 | B0-B1 | BW | 2 | Set to 0 for 20 MHz, 1 for 40 MHz, 2 for 80 MHz, and 3 for 160 MHz and 80 + 80 MHz |
| | B2 | Reserved | 1 | Reserved. Set to 1. |
| | B3 | STBC | 1 | For a VHT SU PPDU: Set to 1 if space time block coding is used and set to 0 otherwise. For a VHT MU PPDU: Set to 0. |
| | B4-B9 | Group ID | 6 | Set to the value of the TXVECTOR parameter GROUP_ID. A value of 0 or 63 indicates a VHT SU PPDU; otherwise, indicates a VHT MU PPDU. |
| | B10-B21 | NSTS/Partial AID | 12 | For a VHT MU PPDU: NSTS is divided into 4 user positions of 3 bits each. User position p, where $0 \leq p \leq 3$, uses bits $B(10 + 3p)$ to $B(12 + 3p)$. The number of space-time streams for user u are indicated at user position p = USER_POSITION[u] where u = 0, 1, . . . , NUM_USERS − 1 and the notation A[b] denotes the value of array A at index b. Zero space-time streams are indicated at positions not listed in the USER_POSITION array. Each user position is set as follows: Set to 0 for 0 space-time streams Set to 1 for 1 space-time stream Set to 2 for 2 space-time streams Set to 3 for 3 space-time streams Set to 4 for 4 space-time streams Values 5-7 are reserved For a VHT SU PPDU: B10-B12 Set to 0 for 1 space-time stream Set to 1 for 2 space-time streams Set to 2 for 3 space-time streams Set to 3 for 4 space-time streams Set to 4 for 5 space-time streams Set to 5 for 6 space-time streams Set to 6 for 7 space-time streams Set to 7 for 8 space-time streams B13-B21 Partial AID: Set to the value of the TXVECTOR parameter PARTIAL_AID. Partial AID provides an abbreviated indication of the intended recipient(s) of the PSDU (see 9.17a). |
| | B22 | TXOP_PS_NOT_ALLOWED | 1 | Set to 0 by VHT AP if it allows non-AP VHT STAs in TXOP power save mode to enter Doze state during a TXOP. Set to 1 otherwise. The bit is reserved and set to 1 in VHT PPDUs transmitted by a non-AP VHT STA. |
| | B23 | Reserved | 1 | Set to 1 |
| VHT-SIG-A2 | B0 | Short GI | 1 | Set to 0 if short guard interval is not used in the Data field. Set to 1 if short guard interval is used in the Data field. |
| | B1 | Short GI $N_{SYM}$ Disambiguation | 1 | Set to 1 if short guard interval is used and $N_{SYM}$ mod 10 = 9; otherwise, set to 0. $N_{SYM}$ defined in 22.4.3. |
| | B2 | SU/MU[0] Coding | 1 | For a VHT SU PPDU, B2 is set to 0 for BCC, 1 for LDPC For a VHT MU PPDU, if the MU[0] NSTS field is nonzero, then B2 indicates the coding used for user u with USER_POSITION[u] = 0; set to 0 for BCC and 1 for LDPC. If the MU[0] NSTS field is 0, then this field is reserved and set to 1. |
| | B3 | LDPC Extra OFDM Symbol | 1 | Set to 1 if the LDPC PPDU encoding process (if an SU PPDU), or at least one LDPC user's PPDU encoding process (if a VHT MU PPDU), results in an extra OFDM symbol (or symbols) as described in 22.3.10.5.4 and 22.3.10.5.5. Set to 0 otherwise. |
| | B4-B7 | SU VHT-MCS/MU[1-3] Coding | 4 | For a VHT SU PPDU: VHT-MCS index For a VHT MU PPDU: If the MU[1] NSTS field is nonzero, then B4 indicates coding for user u with USER_POSITION[u] = 1: set to 0 for BCC, 1 for LDPC. If the MU[1] NSTS field is 0, then B4 is reserved and set to 1. If the MU[2] NSTS field is nonzero, then B5 indicates |

TABLE 1-continued

| Two parts of VHT-SIG-A | Bit | Field | Number of bits | Description |
|---|---|---|---|---|
| | | | | coding for user u with USER_POSITION[u] = 2: set to 0 for BCC, 1 for LDPC. If the MU[2] NSTS field is 0, then B5 is reserved and set to 1. If the MU[3] NSTS field is nonzero, then B6 indicates coding for user u with USER_POSITION[u] = 3: set to 0 for BCC, 1 for LDPC. If the MU[3] NSTS field is 0, then B6 is reserved and set to 1. B7 is reserved and set to 1 |
| | B8 | Beamformed | 1 | For a VHT SU PPDU: Set to 1 if a Beamforming steering matrix is applied to the waveform in an SU transmission as described in 20.3.11.11.2, set to 0 otherwise. For a VHT MU PPDU: Reserved and set to 1 NOTE-If equal to 1 smoothing is not recommended. |
| | B9 | Reserved | 1 | Reserved and set to 1 |
| | B10-B17 | CRC | 8 | CRC calculated as in 20.3.9.4.4 with c7 in B10. Bits 0-23 of HT-SIG1 and bits 0-9 of HT-SIG2 are replaced by bits 0-23 of VHT-SIG-A1 and bits 0-9 of VHT-SIG-A2, respectively. |
| | B18-B23 | Tail | 6 | Used to terminate the trellis of the convolutional decoder. Set to 0. |

[Table 1] illustrates fields, bit positions, numbers of bits, and descriptions included in each of two parts, VHT-SIG-A1 and VHT-SIG-A2, of the VHT-SIG-A field defined by the IEEE 802.11ac standard. For example, a BW (BandWidth) field occupies two Least Significant Bits (LSBs), B0 and B1 of the VHT-SIG-A1 field and has a size of 2 bits. If the 2 bits are set to 0, 1, 2, or 3, the BW field indicates 20 MHz, 40 MHz, 80 MHz, or 160 and 80+80 MHz. For details of the fields included in the VHT-SIG-A field, refer to the IEEE 802.11ac-2013 technical specification. In the HE PPDU frame format of the present invention, the HE-SIG-A field may include one or more of the fields included in the VHT-SIG-A field, and it may provide backward compatibility with IEEE 802.11ac stations.

Figure 8:
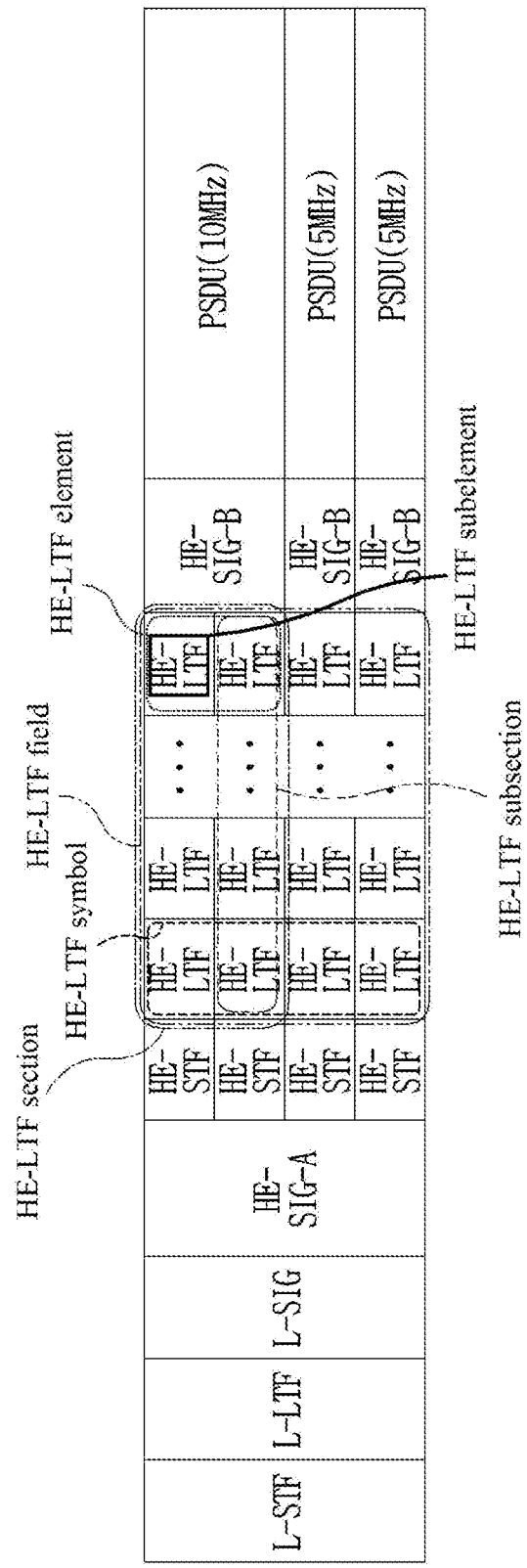
FIG. 8 depicts subchannel allocation in a HE PPDU frame format according to the present invention.

FIG. 8 depicts subchannel allocation in the HE PPDU frame format according to the present invention.

In the example of FIG. 8, it is assumed that information indicating subchannels to which STAs are allocated in HE PPDU indicates that a subchannel of 0 MHz is allocated to STA1 (i.e., no subchannel is allocated), a subchannel of 5 MHz is allocated to each of STA2 and STA3, and a subchannel of 10 MHz is allocated to STA4.

In the example of FIG. 8, an L-STF, an L-LTF, an L-SIG, and a HE-SIG-A may be transmitted per channel (e.g., 20 MHz), a HE-STF and a HE-LTF may be transmitted on each of subchannels being basic subchannel units (e.g., 5 MHz), and a HE-SIG-B and a PSDU may be transmitted on each of subchannels allocated to STAs. A subchannel allocated to a STA has a size required for PSDU transmission to the STA. The size of the subchannel allocated to the STA may be an N (N=1, 2, 3, . . . ) multiple of the size of the basic subchannel unit (i.e., a minimum-size subchannel unit). In the example of FIG. 8, the size of a subchannel allocated to STA2 is equal to that of the basic subchannel unit, the size of a subchannel allocated to STA3 is equal to that of the basic subchannel unit, and the size of a subchannel allocated to STA4 is twice larger than that of the basic subchannel unit.

FIG. 8 illustrates a plurality of HE-LTF elements and a plurality of HE-LTF subelements which are distinguished in the time and frequency domains. One HE-LTF element may correspond to one OFDM symbol in the time domain and one subchannel unit (i.e., the bandwidth of a subchannel allocated to a STA) in the frequency domain. One HE-LTF subelement may correspond to one OFDM symbol in the time domain and one basic subchannel unit (e.g. 5 MHz) in the frequency domain. In the example of FIG. 8, one HE-LTF element includes one HE-LTF subelement in the 5-MHz subchannel allocated to STA2 or STA3. On the other hand, one HE-LTF element includes two HE-LTF subelements in the third subchannel, i.e., 10-MHz subchannel, allocated to STA4. It is to be understood that a HE-LTF element and a HE-LTF subelement are logical units and the PHY layer does not always operate in units of a HE-LTF element or HE-LTF subelement.

A HE-LTF symbol may correspond to a set of HE-LTF elements in one OFDM symbol in the time domain and one channel unit (e.g. 20 MHz) in the frequency domain. That is, one HE-LTF symbol may be divided into HE-LTF elements by a subchannel width allocated to a STA and into HE-LTF subelements by the width of the basic subchannel unit in the frequency domain.

A HE-LTF section may correspond to a set of HE-LTF elements in one or more OFDM symbols in the time domain and one subchannel unit (i.e. the bandwidth of a subchannel allocated to a STA) in the frequency domain. A HE-LTF subsection may correspond to a set of HE-LTF elements in one or more OFDM symbols in the time domain and one basic subchannel unit (e.g., 5 MHz) in the frequency domain. In the example of FIG. 8, one HE-LTF section includes one HE-LTF subsection in the 5-MHz subchannel allocated to STA2 or STA3. On the other hand, one HE-LTF section includes two HE-LTF subsections in the third subchannel, i.e., 10-MHz subchannel, allocated to STA4.

A HE-LTF field may correspond to a set of HE-LTF elements (or subelements), HE-LTF symbols, or HE-LTF sections (or subsections) for a plurality of stations.

For the afore-described HE PPDU transmission, subchannels allocated to a plurality of HE STAs may be contiguous in the frequency domain. In other words, for HE PPDU transmission, the subchannels allocated to the HE STAs may be sequential and any intermediate one of the subchannels of one channel (e.g., 20 MHz) may not be allowed to be unallocated or empty. Referring to FIG. 7, if one channel includes four subchannels, it may not be allowed to keep the third subchannel unallocated and empty, while the first, second, and fourth subchannels are allocated to STAs. However, the present invention does not exclude non-allocation of a intermediate subchannel of one channel to a STA.

Figure 9:
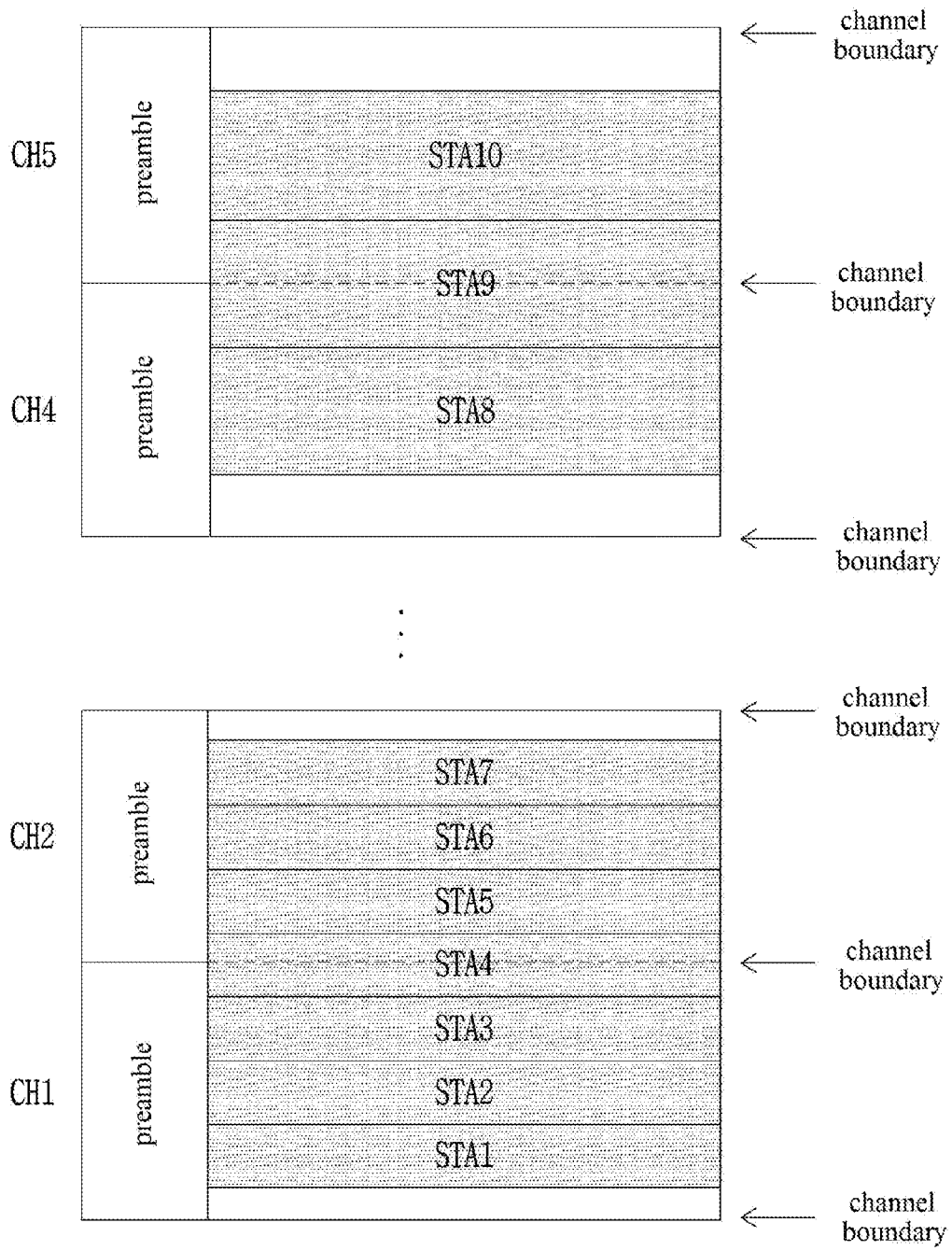
FIG. 9 depicts a subchannel allocation method according to the present invention.

FIG. 9 depicts a subchannel allocation method according to the present invention.

In the example of FIG. 9, a plurality of contiguous channels (e.g., 20-MHz-bandwidth channels) and boundaries of the plurality of contiguous channels are shown. In FIG. 9, a preamble may correspond to an L-STF, an L-LTF, an L-SIG, and a HE-SIG-A as illustrated in the examples of FIGS. 7 and 8.

A subchannel for each HE STA may be allocated only within one channel, and may not be allocated with partially overlapping between a plurality of channels. That is, if there are two contiguous 20-MHz channels CH1 and CH2, subchannels for STAs paired for MU-MIMO-mode or OFDMA-mode transmission may be allocated either within CH1 or within CH2, and it may be prohibited that one part of a subchannel exists in CH1 and another part of the subchannel exists in CH2. This means that one subchannel may not be allocated with crossing a channel boundary. From the perspective of RUs supporting the MU-MIMO or OFDMA mode, a bandwidth of 20 MHz may be divided into one or more RUs, and a bandwidth of 40 MHz may be divided into one or more RUs in each of two contiguous 20-MHz bandwidths, and no RU is allocated with crossing the boundary between two contiguous 20-MHz bandwidths.

As described above, it is not allowed that one subchannel belongs to two or more 20-MHz channels. Particularly, a 2.4-GHz OFDMA mode may support a 20-MHz OFDMA mode and a 40-MHz OFDMA mode. In the 2.4-GHz OFDMA mode, it may not be allowed that one subchannel belongs to two or more 20-MHz channels.

FIG. 9 is based on the assumption that subchannels each having the size of a basic subchannel unit (e.g., 5 MHz) in CH1 and CH2 are allocated to STA1 to STA7, and subchannels each having double the size (e.g., 10 MHz) of the basic subchannel unit in CH4 and CH5 are allocated to STA8, STA9, and STA10.

As illustrated in the lower part of FIG. 9, although a subchannel allocated to STA1, STA2, STA3, STA5, STA6, or STA7 is fully overlapped only with one channel (i.e., without crossing the channel boundary, or belonging only to one channel), a subchannel allocated to STA4 is partially overlapped with the two channels (i.e., crossing the channel boundary, or belonging to the two channels). In the forgoing example of the present invention, the subchannel allocation to STA4 is not allowed.

As illustrated in the upper part of FIG. 9, although a subchannel allocated to STA8 or STA10 is fully overlapped only with one channel (i.e., crossing the channel boundary, or belonging only to one channel), a subchannel allocated to STA9 is partially overlapped with two channels (i.e., crossing the channel boundary, or belonging to the two channels). In the forgoing example of the present invention, the subchannel allocation to STA9 is not allowed.

On the other hand, it may be allowed to allocate a subchannel partially overlapped between a plurality of channels (i.e., crossing the channel boundary, or belonging to two channels). For example, in SU-MIMO mode transmission, a plurality of contiguous channels may be allocated to a STA and any of one or more subchannels allocated to the STA may cross the boundary between two contiguous channels.

While the following description is given with an assumption that one subchannel has a channel bandwidth of 5 MHz in one channel having a channel bandwidth of 20 MHz, this is provided to simplify the description of the principle of the present invention and thus should not be construed as limiting the present invention. For example, the bandwidths of a channel and a subchannel may be defined or allocated as values other than the above examples. In addition, a plurality of subchannels in one channel may have the same or different channel widths.

FIG. 10 depicts the starting and ending points of a HE-LTF field in the HE PPDU frame format according to the present invention.

To support the MU-MIMO mode and the OFDMA mode, the HE PPDU frame format according to the present invention may include, in the HE-SIG-A field, information about the number of spatial streams to be transmitted to a HE STA allocated to each subchannel.

If MU-MIMO-mode or OFDMA-mode transmission is performed to a plurality of HE STAs on one subchannel, the number of spatial streams to be transmitted to each of the HE STAs may be provided in the HE-SIG-A or HE-SIG-B field, which will be described later in detail.

FIG. 10 is based on the assumption that a first 5-MHz subchannel is allocated to STA1 and STA2 and two spatial streams are transmitted to each STA in a DL MU-MIMO or OFDMA mode (i.e., a total of four spatial streams are transmitted on one subchannel). For this purpose, a HE-STF, a HE-LTF, a HE-LTF, a HE-LTF, a HE-LTF, and a HE-SIG-B follow the HE-SIG-A field on the subchannel. The HE-STF is used for frequency offset estimation and phase offset estimation for the 5-MHz subchannel. The HE-LTFs are used for channel estimation for the 5-MHz subchannel. Since the subchannel carries four spatial streams, as many HE-LTFs (i.e., HE-LTF symbols or HE-LTF elements in a HE-LTF section) as the number of the spatial streams, that is, four HE-LTFs are required to support MU-MIMO transmission.

According to an example of the present invention, a relationship between a number of total spatial streams transmitted in one subchannel and a number of HE-LTF are listed in [Table 2].

TABLE 2

| Total number of spatial streams transmitted on one subchannel | Number of HE-LTFs |
| --- | --- |
| 1 | 1 |
| 2 | 2 |
| 3 | 4 |
| 4 | 4 |
| 5 | 6 |
| 6 | 6 |
| 7 | 8 |
| 8 | 8 |

Referring to [Table 2], if one spatial stream is transmitted on one subchannel, at least one HE-LTF needs to be transmitted on the subchannel. If an even number of spatial streams are transmitted on one subchannel, at least as many HE-LTFs as the number of the spatial streams need to be transmitted. If an odd number of spatial streams greater than one are transmitted on one subchannel, at least as many HE-LTFs as a number of adding 1 to the number of the spatial streams need to be transmitted.

Referring to FIG. 10 again, it is assumed that the second 5-MHz subchannel is allocated to STA3 and STA4 and one spatial streams per STA is transmitted in the DL MU-MIMO or OFDMA mode (i.e., a total of two spatial streams are transmitted on one subchannel). In this case, two HE-LTFs need to be transmitted on the second subchannel, however, in the example of FIG. 10, a HE-STF, a HE-LTF, a HE-LTF, a HE-LTF, a HE-LTF, and a HE-SIG-B follow the HE-SIG-A field on the subchannel (i.e., four HE-LTFs are transmitted). This is for setting the same starting time of PSDU transmission for subchannels allocated to other STAs paired with STA3 and STA4 for MU-MIMO transmission. If only two HE-LTFs are transmitted on the second subchannel, PSDUs are transmitted at different time points on the first and second subchannels. PSDU transmission on each subchannel at a different time point results in discrepancy between OFDM symbol timings of subchannels, thereby no orthogonality is maintained. To overcome this problem, an additional constraint need to be imposed for HE-LTF transmission.

Basically, transmission of as many HE-LTFs as required is sufficient in an SU-MIMO or non-OFDMA mode. However, timing synchronization (or alignment) with fields transmitted on subchannels for other paired STAs is required in the MU-MIMO or OFDMA mode. Accordingly, the numbers of HE-LTFs may be determined for all other subchannels based on a subchannel having the maximum number of streams in MU-MIMO-mode or OFDMA-mode transmission.

Specifically, the numbers of HE-LTFs may be determined for all subchannels according to the maximum of the numbers of HE-LTFs (HE-LTF symbols or HE-LTF elements in a HE-LTF section) required according to the total numbers of spatial streams transmitted on each subchannel, for a set of HE STAs allocated to each subchannel. A "set of HE STAs allocated to each subchannel" is one HE STA in the SU-MIMO mode, and a set of HE STAs paired across a plurality of subchannels in the MU-MIMO mode. The 'number of spatial streams transmitted on each subchannel' is the number of spatial streams transmitted to one HE STA in the SU-MIMO mode, and the number of spatial streams transmitted to a plurality of HE STAs paired on the subchannel in the MU-MIMO mode.

That is, it may be said that a HE-LTF field starts at the same time point and ends at the same time point in a HE PPDU for all users (i.e. HE STAs) in MU-MIMO-mode or OFDMA-mode transmission. Or it may be said that the lengths of HE-LTF sections are equal on a plurality of subchannels for all users (i.e. HE STAs) in MU-MIMO-mode or OFDMA-mode transmission. Or it may be said that the number of HE-LTF elements included in each HE-LTF section is equal on a plurality of subchannels for all users (i.e. HE STAs) in MU-MIMO-mode or OFDMA-mode transmission. Accordingly, PSDU transmission timings may be synchronized among a plurality of subchannels for all HE STAs in MU-MIMO-mode or OFDMA-mode transmission.

As described above, the number of HE-LTF symbols (refer to FIG. 7) may be 1, 2, 4, 6, or 8 in HE PPDU transmission in the MU-MIMO or OFDMA mode, determined according to the maximum of the numbers of spatial streams on each of a plurality of subchannels. A different number of spatial streams may be allocated to each of a plurality of subchannels, and the number of spatial streams allocated to one subchannel is the number of total spatial streams for all users allocated to the subchannel. That is, the number of HE-LTF symbols may be determined according to the number of spatial streams allocated to a subchannel having a maximum number of spatial streams by comparing the number of total spatial streams for all users allocated to one of a plurality of subchannels with the number of total spatial streams for all users allocated to another subchannel.

Specifically, in HE PPDU transmission in the OFDMA mode, the number of HE-LTF symbols may be 1, 2, 4, 6, or 8, determined based on the number of spatial streams transmitted in a subchannel having a maximum number of spatial streams across a plurality of subchannels. Further, in HE PPDU transmission in the OFDMA mode, the number of HE-LTF symbols may be determined based on whether the number of spatial streams transmitted in a subchannel having a maximum number of spatial streams across a plurality of subchannels is odd or even (refer to [Table 2]). That is, in HE PPDU transmission in the OFDMA mode, when the number (e.g., K) of spatial streams transmitted in a subchannel having a maximum number of spatial streams across a plurality of subchannels is an even number, the number of HE-LTF symbols may be equal to K. In HE PPDU transmission in the OFDMA mode, when the number, K, of spatial streams transmitted in a subchannel having a maximum number of spatial streams across a plurality of subchannels is an odd number greater than one, the number of HE-LTF symbols may be equal to K+1.

When only one STA is allocated to one subchannel in OFDMA mode (i.e., OFDMA mode without using MU-MIMO), a subchannel having a maximum number of spatial streams across a plurality of subchannels may be determined by the number of spatial streams for a STA allocated to each subchannel. When more than one STA is allocated to one subchannel in OFDMA mode (i.e., OFDMA mode using MU-MIMO), a subchannel having a maximum number of spatial streams across a plurality of subchannels may be determined by the number of STAs allocated to each subchannel and the number of spatial streams for each STA allocated to each subchannel (e.g., if STA1 and STA2 are allocated to one subchannel, sum of the number of spatial streams for STA1 and the number of spatial streams for STA2).

When transmitting a HE PPDU frame in the MU-MIMO or OFDMA mode, a transmitter may generate P (P is an integer equal to or larger than 1) HE-LTF symbols (refer to FIG. 7) and transmit a HE PPDU frame including at least the P HE-LTF symbols and a Data field to a receiver. The HE PPDU frame may be divided into Q subchannels in the frequency domain (Q is an integer equal to or larger than 2). Each of the P HE-LTF symbols may be divided into Q HE-LTF elements corresponding to the Q subchannels in the frequency domain. That is, the HE PPDU may include P HE-LTF elements on one subchannel (herein, the P HE-LTF elements may belong to one HE-LTF section on the subchannel).

As described above, the number of HE-LTF elements (i.e., P) in one of the Q subchannels may be equal to the number of HE-LTF elements (i.e. P) of another subchannel. Also, the number of HE-LTF elements (i.e., P) included in a HE-LTF section in one of the Q subchannels may be equal to the number of HE-LTF elements (i.e. P) included in a HE-LTF section in another subchannel. The HE-LTF section of one of the Q subchannels may start and end at the same time points as the HE-LTF section of another subchannel. Also, the HE-LTF sections may start and end at the same time points across the Q subchannels (i.e., across all users or stations).

Referring to FIG. 10 again, the third 5-MHz subchannel is allocated to STA5 and one spatial stream is transmitted on the subchannel in SU-MIMO (considering all subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

The fourth 5-MHz subchannel is allocated to STA6 and one spatial stream is transmitted on the subchannel in SU-MIMO (considering all other subchannels, a plurality of spatial streams are transmitted to STA1 to STA6 in MU-MIMO or OFDMA mode). In this case, although transmission of one HE-LTF is sufficient for the subchannel, as many HE-LTFs as the maximum of the numbers of HE-LTFs on the other subchannels, that is, four HE-LTFs are transmitted on the subchannel in order to align the starting points and ending points of the HE-LTF fields of the subchannels.

In the example of FIG. 10, the remaining two HE-LTFs except two HE-LTFs required for channel estimation of STA3 and STA4 on the second subchannel, the remaining three HE-LTFs except one HE-LTF required for channel estimation of STA5 on the third subchannel, and the remaining three HE-LTFs except one HE-LTF required for channel estimation of STA6 on the fourth subchannel may be said to be placeholders that are actually not used for channel estimation at the STAs.

FIG. 11 depicts a HE-SIG-B field and a HE-SIG-C field in the HE PPDU frame format according to the present invention.

To effectively support MU-MIMO-mode or OFDMA-mode transmission in the HE PPDU frame format according to the present invention, independent signaling information may be transmitted on each subchannel. Specifically, a different number of spatial streams may be transmitted to each of a plurality of HE STAs that receive an MU-MIMO-mode or OFDMA-mode transmission simultaneously. Therefore, information about the number of spatial streams to be transmitted should be indicated to each HE STA.

Information about the number of spatial streams on one channel may be included in, for example, a HE-SIG-A field. A HE-SIG-B field may include spatial stream allocation information about one subchannel. Also, a HE-SIG-C field may be transmitted after transmission of HE-LTFs, including MCS information about a PSDU and information about the length of the PSDU, etc.

With reference to the foregoing examples of the present invention, mainly the features of a HE PPDU frame structure applicable to a DL MU-MIMO-mode or OFDMA-mode transmission that an AP transmits simultaneously to a plurality of STAs have been described. Now, a description will be given of the features of a HE PPDU frame structure applicable to a UL MU-MIMO-mode or OFDMA-mode transmission that a plurality of STAs transmits simultaneously to an AP.

The above-described various examples of structures of the HE PPDU frame format supporting MU-MIMO-mode or OFDMA-mode transmission are not applicable only to DL but also applicable UL. For example, the above-described exemplary HE PPDU frame formats may also be used for a UL HE PPDU transmission that a plurality of STAs simultaneously transmits to a single AP.

However, in the case of a DL MU-MIMO-mode or OFDMA-mode HE PPDU transmission that an AP simultaneously transmits to a plurality of STAs, the transmission entity, AP has knowledge of the number of spatial streams transmitted to a HE STA allocated to each of a plurality of subchannels. Therefore, the AP may include, in a HE-SIG-A field or a HE-SIG-B field, information about the total number of spatial streams transmitted across a channel, a maximum number of spatial streams (i.e., information being a basis of the number of HE-LTF elements (or the starting point and ending point of a HE-LTF section) on each subchannel), and the number of spatial streams transmitted on each subchannel. In contrast, in the case of a UL MU-MIMO-mode or OFDMA-mode HE PPDU transmission that a plurality of STAs simultaneously transmits to an AP, each STA being a transmission entity may be aware only of the number of spatial streams in a HE PSDU that it will transmit, without knowledge of the number of spatial streams in a HE PSDU transmitted by another STA paired with the STA. Accordingly, the STA may determine neither the total number of spatial streams transmitted across a channel nor a maximum number of spatial streams.

To solve this problem, a common parameter (i.e., a parameter applied commonly to STAs) and an individual parameter (a separate parameter applied to an individual STA) may be configured as follows in relation to a UL HE PPDU transmission.

For simultaneous UL HE PPDU transmissions from a plurality of STAs to an AP, a protocol may be designed in such a manner that the AP sets a common parameter or individual parameters (common/individual parameters) for the STAs for the UL HE PPDU transmissions and each STA operates according to the common/individual parameters. For example, the AP may transmit a trigger frame (or polling frame) for a UL MU-MIMO-mode or OFDMA-mode transmission to a plurality of STAs. The trigger frame may include a common parameter (e.g., the number of spatial streams across a channel or a maximum number of spatial streams) and individual parameters (e.g., the number of spatial streams allocated to each subchannel), for the UL MU-MIMO-mode or OFDMA-mode transmission. As a consequence, a HE PPDU frame format applicable to a UL MU-MIMO or OFDMA mode may be configured without a modification to an exemplary HE PPDU frame format applied to a DL MU-MIMO or OFDMA mode. For example, each STA may configure a HE PPDU frame format by including information about the number of spatial streams across a channel in a HE-SIG-A field, determining the number of HE-LTF elements (or the starting point and ending point of a HE-LTE section) on each subchannel according to the maximum number of spatial streams, and including information about the number of spatial streams for the individual STA in a HE-SIG-B field.

Alternatively, if the STAs operate always according to the common/individual parameters received in the trigger frame from the AP, each STA does not need to indicate the common/individual parameters to the AP during a HE PPDU transmission. Therefore, this information may not be included in a HE PPDU. For example, each STA may have only to determine the total number of spatial streams, the maximum number of spatial streams, and the number of spatial streams allocated to individual STA, as indicated by the AP, and configure a HE PPDU according to the determined numbers, without including information about the total number of spatial streams or the number of spatial streams allocated to the STA in the HE PPDU.

On the other hand, if the AP does not provide common/individual parameters in a trigger frame, for a UL MIMO-mode or OFDMA-mode HE PPDU transmission, the following operation may be performed.

Common transmission parameters (e.g., channel Band-Width (BW) information, etc.) for simultaneously transmitted HE PSDUs may be included in HE-SIG-A field, but parameters that may be different for individual STAs (e.g., the number of spatial streams, an MCS, and whether STBC is used or not, for each individual STA) may not be included in HE-SIG-A field. Although the individual parameters may be included in HE-SIG-B field, information about the number of spatial streams and information indicating whether STBC is used or not, need to be transmitted before a HE-LTF field because the number of spatial streams and the information indicating whether STBC is used or not are significant to determination of configuration information about a preamble and a PSDU in a HE PPDU frame format (e.g., the number of HE-LTF elements is determined according to a combination of the number of spatial streams and the information indicating whether STBC is used or not). For this purpose, a HE PPDU frame format as illustrated in FIG. 12 may be used for a UL HE PPDU transmission.

Figure 12:
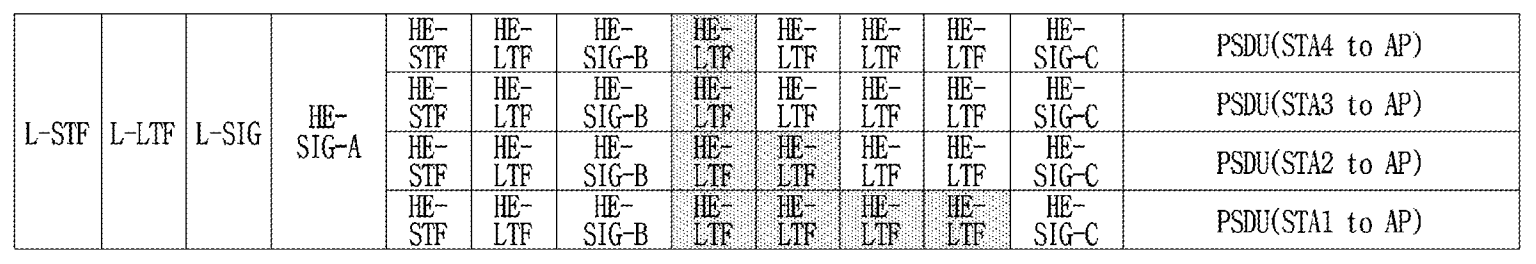

FIG. 12 depicts another exemplary HE PPDU frame format according to the present invention. The HE PPDU frame format illustrated in FIG. 12 is characterized in that a structure of HE-SIG-A, HE-SIG-B, and HE-SIG-C fields similar to in FIG. 10 is used for a UL PPDU transmission.

As described before, if a UL MU-MIMO-mode or OFDMA-mode transmission is performed by triggering of an AP (according to common/individual parameters provided by the AP), an individual STA may not need to report an individual parameter to the AP. In this case, one or more of a HE-SIG-B field, a HE-SIG-C field, and a first HE-LTF element (i.e., a HE-LTF between a HE-STF field and a HE-SIG-B field) illustrated in FIG. 12 may not exist. In this case, a description of each field given below may be understood that it is applied only in the presence of the field.

In the example of FIG. 12, a HE-SIG-A field is transmitted per channel (i.e., per 20-MHz channel) and may include transmission parameters common to simultaneously transmitted HE PSDUs. Since the same information is transmitted in up to HE-SIG-A fields in UL PPDUs transmitted by HE STAs allocated to subchannels, the AP may receive the same signals from the plurality of STAs successfully.

A HE-SIG-B field is transmitted per subchannel in one channel. The HE-SIG-B field may have an independent parameter value according to the transmission characteristics of a HE PSDU transmitted on each subchannel. The HE-SIG-B field may include spatial stream allocation information and information indicating whether STBC is used or not, for each subchannel. If MU-MIMO is applied to a subchannel (i.e., if a plurality of STAs perform transmission on a subchannel), the HE-SIG-B field may include a common parameter for the plurality of STAs paired on the subchannel.

A HE-SIG-C field is transmitted on the same subchannel as the HE-SIG-B field and may include information about an MCS and a packet length. If MU-MIMO is applied to a subchannel (i.e., if a plurality of STAs perform transmission on a subchannel), the HE-SIG-C field may include respective individual parameters for each of the plurality of STAs paired on the subchannel.

Similarly to DL MU-MIMO-mode or OFDMA-mode HE PPDU transmission, transmissions of PSDUs may start at different time points on subchannels in UL MU-MIMO-mode or OFDMA-mode HE PPDU transmission, and if OFDM symbols are not aligned accordingly, then the implementation complexity of an AP that receives a plurality of PSDUs increased. To solve this problem, 'the number of HE-LTFs may be determined for all subchannels according to the maximum of the numbers of HE LTFs required according to the total numbers of spatial streams transmitted on each subchannel for a set of HE STAs allocated to each of subchannels' as described with reference to the example of FIG. 10.

This feature may mean that the HE-LTF field start at the same time point and end at the same time point across all users (i.e., HE STAs) in UL MU-MIMO-mode or OFDMA-mode transmission. Or it may be said that the HE-LTF sections of a plurality of subchannels have the same length across all HE STAs in UL MU-MIMO-mode or OFDMA-mode transmission. Or it may be said that each of the HE-LTF sections of a plurality of subchannels includes the same number of HE-LTF elements across all HE STAs in UL MU-MIMO-mode or OFDMA-mode transmission. Therefore, PSDU transmission timings are synchronized between a plurality of subchannels across all HE STAs in UL MU-MIMO-mode or OFDMA-mode transmission.

As described before, a plurality of STAs may simultaneously transmit PSDUs in a HE PPDU frame format to an AP on subchannels allocated to the STAs (i.e., referred to as UL MU-MIMO or OFDMA transmission or "UL MU transmission"), and a plurality of STAs may simultaneously receive a PSDU in a HE PPDU frame format from an AP on subchannels allocated to the STAs (i.e., referred to as DL MU-MIMO or OFDMA transmission or "DL MU transmission").

Now, a description will be given of an exemplary ACK procedure of a receiver (i.e., an AP) in response to a UL MU-MIMO or OFDMA transmission and an exemplary ACK procedure of a receiver (i.e., each of a plurality of STAs) in response to a DL MU-MIMO or OFDMA transmission according to the present invention.

According to the present invention, ACK frames transmitted in response to an MU transmission for a plurality of STAs may have the same property for each of the STAs. Specifically, ACK frames transmitted in response to an MU transmission for a plurality of STAs may have the same length, transmission time, or type for each of the STAs. An AP may transmit DL ACK frames to a plurality of STAs in response to a UL MU transmission and the DL ACK frames for the STAs may have the same property. The plurality of STAs may transmit UL ACK frames to the AP in response to a DL MU transmission and the UL ACK frames from the STAs may have the same property.

Such an MU transmission for a plurality of STAs may be elicited by a trigger frame transmitted from an MU transmission-receiver. For example, the trigger frame may be a CTS frame, a PS-Poll frame, or an ACK frame.

Figure 13:
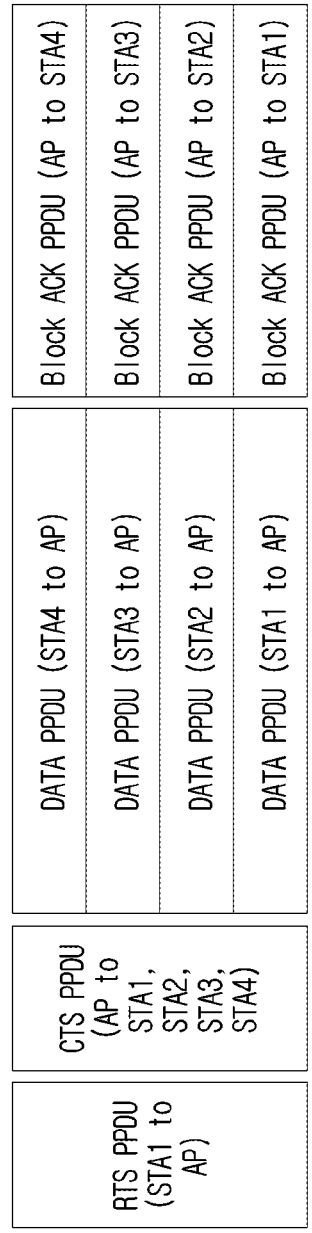
FIG. 13 depicts an exemplary block ACKnowledgement (ACK) procedure in response to an Uplink (UL) Multi-User (MU) transmission according to the present invention.

FIG. 13 depicts an exemplary block ACK procedure performed in response to a UL MU transmission according to the present invention.

FIG. 13 illustrates an example in which ACK frames for a UL MU transmission elicited by a trigger frame (i.e., a CTS frame) transmitted from an AP have the same property for each of a plurality of STAs. In FIG. 13, a plurality of STAs respectively transmit data frames (e.g., PPDU frames each including a PSDU, on a plurality of subchannels) on subchannels allocated to the STAs and receive ACKs in block ACK frames from an AP in response to the transmitted data frames.

In the example of FIG. 13, upon expiration of a backoff timer, an STA (e.g., STA1) may transmit an RTS PPDU to the AP according to an Enhanced Distributed Channel Access (EDCA) protocol.

Upon receipt of the RTS PPDU, the AP may determine STAs (e.g., STA2, STA3, and STA4) to perform a UL MU-MIMO or OFDMA transmission simultaneously with STA1 and transmit a CTS PPDU to the plurality of STAs. The CTS PPDU may include a list of STAs (e.g., STA1, STA2, STA3, and STA4) allowed to be allocated to subchannels and perform simultaneous PSDU transmissions on the subchannels. That is, the CTS PPDU may correspond to the afore-described trigger frame (or polling frame) for a UL MU-MIMO or OFDMA transmission.

Upon receipt of an indication allowing a UL MU-MIMO or OFDMA transmission in the CTS PPDU, the STAs transmit PSDUs on their allocated subchannels. In the example of FIG. 13, STA1, STA2, STA3, and STA4 transmit DATA PPDUs respectively on four subchannels. While not shown for clarity of description, the plurality of DATA PPDUs may be transmitted in a HE PPDU frame format in FIG. 13 (e.g., one or more of a L-STF, a L-LTF, a L-SIG, and a HE-SIG-A are transmitted on one channel, one or more of a HE-STF, a HE-LTF, a HE-SIG-B, and a HE-SIG-C are transmitted respectively on each subchannel, and a PSDU is transmitted on each subchannel). That is, a DATA PPDU for an STA allocated to one subchannel is a data frame including one or more of a L-STF, a L-LTF, a L-SIG, and a HE-SIG-A on one channel, one or more of a HE-STF, a HE-LTF, a HE-SIG-B, and a HE-SIG-C on one subchannel, and a PSDU on one subchannel. This may be referred to as a data frame on a subchannel from the perspective of a PSDU (i.e., an MPDU or A-MPDU). Further, a set of the plurality of DATA PSDUs illustrated in FIG. 13 corresponds to a HE PPDU frame including a legacy preamble, a HE preamble, and PSDUs (i.e., MPDUs or A-MPDUs) on a plurality of subchannels and this may be referred to as a data frame on one channel including a plurality of subchannels, from the perspective of PSDUs (i.e., MPDUs or an Aggregate MPDU (A-MPDU)).

Upon receipt of PSDUs on the respective subchannels from the plurality of STAs, the AP may transmit ACKs in response to the received PSDUs, in the form of blocks ACKs on the subchannels in which the PSDUs haven been received. A block ACK procedure is a scheme in which one block ACK frame is used for a plurality of MPDUs instead of individual ACKs for all MPDUs. An MPDU transmitted from the MAC layer to the PHY layer may correspond to a PSDU at the PHY layer (although an MPDU is similar to a PSDU, a plurality of individual MPDUs aggregated into an A-MPDU may be different from the PSDU). The block ACK frame includes a block ACK bitmap and each bit of the block ACK bitmap may indicate reception success/failure (or decoding success/failure) of an individual MPDU. For details of a legacy block ACK procedure, the IEEE 802.11c technical specifications may be referred to.

A detailed configuration of ACK PPDUs on a plurality of subchannels in the example of FIG. 13, may be described in a similar manner to the afore-described detailed configuration of DATA PPDUs on a plurality of subchannels. That is, ACK PPDUs on a plurality of subchannels may collectively correspond to ACK frames constructed in a HE PPDU frame format and may be referred to as an ACK frame on one channel including a plurality of subchannels from the perspective of PSDUs (i.e., MPDUs or an A-MPDU). From the viewpoint of individual ACK PPDUs, each ACK PPDU may be an ACK frame including a legacy preamble transmitted on one channel, and a HE preamble and a PSDU transmitted on one subchannel and may be referred to as an ACK frame on a subchannel from the perspective of a PSDU (i.e., an MPDU or A-MPDU).

As described above, a plurality of block ACK frames that an AP transmits to a plurality of STAs on a plurality of subchannels at the same time may have the same property (e.g., the same length, transmission time, or type).

Figure 14:
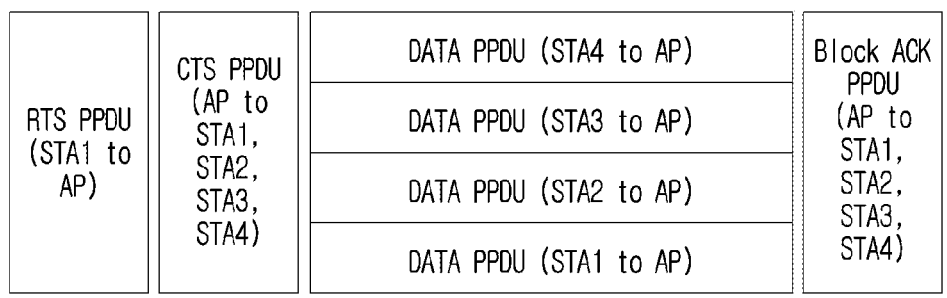
FIG. 14 depicts another exemplary block ACK procedure in response to a UL MU transmission according to the present invention.

FIG. 14 depicts another exemplary block ACK procedure performed in response to a UL MU transmission according to the present invention.

FIG. 14 illustrates an example in which ACK frames for a UL MU transmission elicited by a trigger frame (i.e. a CTS frame) from an AP have the same property for the plurality of STAs. In the example of FIG. 14, transmission of an RTS PPDU, transmission of a CTS PPDU, and MU-MIMO or OFDMA transmission of a DATA PPDU on an allocated subchannel by each STA are performed in the same manner as in FIG. 13 and thus will not be described to avoid redundancy.

As in the afore-described example of FIG. 13, a procedure for transmitting block ACK PPDUs to a plurality of STAs on a plurality of subchannels in response to a received UL MU-MIMO or OFDMA transmission increases overhead in view of configuration of a different DATA PPDU for each subchannel by the AP. Accordingly, a block ACK for a UL MU-MIMO or OFDMA transmission may be transmitted on total subchannels in the example of FIG. 14.

That is, it may be said that the AP transmits block ACK PPDUs in OFDMA to the individual STAs at the same time in FIG. 13, while the AP multicasts/broadcasts a block ACK PPDU having an aggregate of block ACK bitmaps for the respective STAs on the total subchannels (e.g., on one channel without distinction made between the subchannels, that is, in non-OFDMA). Accordingly, the overhead of the AP may be reduced, compared to generation and transmission of PPDUs on individual subchannels.

In this manner, one block ACK frame that the AP transmits on one channel to the plurality of STAs may have the same property (e.g., the same length, transmission time, or type).

In the foregoing examples of the present invention, if an AP transmits a trigger frame to a plurality of STAs and receives a UL MU frame from the plurality of STAs in response to the trigger frame, the AP may determine a transmission mode for an ACK frame to be transmitted in response to the UL MU frame, based on the UL MU frame. That is, upon receipt of a UL MU frame, the AP may select one of OFDMA (e.g., the example of FIG. 13) and non-OFDMA (e.g., the example of FIG. 14) as the transmission mode of the ACK frame based on information about the UL MU frame (e.g., control information included in the UL MU frame, the transmission mode or type of the UL MU frame, etc.), and generate and transmit an ACK frame according to the determined transmission mode on DL.

An STA may transmit the UL MU frame in response to the trigger frame received from the AP and receive the ACK frame from the AP in response to the UL MU frame. The STA may process the ACK frame according to the transmission mode of the received ACK frame. The transmission mode of the ACK frame may be determined based on the UL MU frame that the STA has transmitted to the AP. For example, if the transmission mode of the ACK frame is OFDMA, the STA may acquire ACK information for the STA by decoding a signal received on a subchannel allocated to the STA. If the transmission mode of the ACK frame is non-OFDMA, the STA may acquire ACK information for the STA by decoding a signal received on an entire channel.

FIG. 15 depicts an exemplary ACK procedure performed in response to a DL MU transmission according to the present invention.

FIG. 15 illustrates an example in which ACK frames transmitted in response to a DL MU transmission triggered by a trigger frame (i.e., a CTS frame) transmitted by an STA have the same property for a plurality of STAs. In FIG. 15, the AP allocates subchannels to the respective STAs, transmits PSDUs simultaneously to the STAs on the subchannels, and receives ACKs in response to the PSDUs, in the form of block ACKs from the plurality of STAs.

In the example of FIG. 15, upon expiration of a backoff timer, the AP may transmit an RTS PPDU to a destination STA (e.g., STA1) according to the EDCA protocol.

Upon receipt of the RTS PPDU, the destination STA (e.g., STA1) may transmit a CTS PPDU to the AP. Upon receipt of the CTS PPDU, the AP may transmit PSDUs simultaneously to a plurality of STAs by allocating subchannels to the respective STAs. The plurality of STAs may include other STAs (e.g., STA2, STA3, and STA4) as well as the destination STA (e.g., STA1) that has exchanged RTS/CTS with the AP. In the example of FIG. 15, the AP transmits DATA PPDUs to STA1, STA2, STA3, and STA4 on four subchannels, respectively. While not shown for clarity of description, the plurality of DATA PPDUs may be transmitted in a HE PPDU frame format (e.g., one or more of a L-STF, a L-LTF, a L-SIG, and a HE-SIG-A are transmitted on one channel, one or more of a HE-STF, a HE-LTF, a HE-SIG-B, and a HE-SIG-C are transmitted respectively on each subchannel, and a PSDU is transmitted on each subchannel) in FIG. 15. That is, a DL DATA PPDU of FIG. 15 may be configured similarly to a UL DATA PPDU of FIG. 13 and a UL ACK PPDU of FIG. 15 may be configured similarly to a DL ACK PPDU of FIG. 13.

Upon receipt of a PSDU on a subchannel from the AP, each STA may transmit an ACK in response to the received PSDU, in the form of a block ACK on the subchannel in which the PSDU has been received.

Meanwhile, if the ACK policy of a DATA PPDU transmitted on a subchannel is normal ACK, an STA that has received the DATA PPDU responds to the DATA PPDU with a normal ACK PPDU, instead of a block ACK PPDU. For example, in the case where a DATA PPDU is transmitted in the form of an A-MPDU, like a VHT single PPDU or a HE single PPDU but includes only one MPDU, it may be regulated that an STA receiving the DATA PPDU responds to the DATA PPDU with a normal ACK PPDU, instead of a block ACK PPDU.

Considering the above, it may occur that DATA PPDUs transmitted on different subchannels have different ACK policies. In this case, each STA receiving a DATA PPDU transmits a different type of ACK PPDU. For example, STA1 may transmit a block ACK PPDU to the AP, as an ACK in response to a PSDU received on a first subchannel, and STA2 may transmit a normal ACK PPDU to the AP, as an ACK in response to a PSDU received on a second subchannel. Since a normal ACK PPDU and a block ACK PPDU typically have different lengths, the length of the response frame transmitted on the first subchannel by STA1 may be different from the length of the response frame transmitted on the second subchannel by STA2. However, to enable a receiver (e.g., the AP) to receive response frames successfully in MU-MIMO or OFDMA in which a plurality of STAs perform simultaneous transmissions, the STAs need to be identical in terms of the length, transmission time, or type of response frames that the STAs transmit. Therefore, for the plurality of STAs, the same ACK policy should be configured for DATA PPDUs transmitted on the plurality of subchannels.

In the example of FIG. 15, data frames that the AP transmits to the plurality of STAs in a DL MU transmission may be regarded as trigger frames for ACK frames that the plurality of STAs transmit to the AP in a UL MU transmission. That is, the UL MU ACK frames may be transmitted based on information of the trigger frames for them (e.g., the ACK policies of the DL MU data frames).

As described above, a plurality of block ACK frames transmitted simultaneously on a plurality of subchannels by a plurality of STAs may have the same property (e.g., the same length, transmission time, or type).

FIG. 16 depicts another exemplary ACK procedure performed in response to a DL MU transmission according to the present invention.

FIG. 16 illustrates an example in which ACK frames transmitted in response to a DL MU transmission triggered by a trigger frame (i.e., a CTS frame) transmitted by an STA have the same property for a plurality of STAs. In FIG. 16, if the ACK policy of a DATA PPDU is normal ACK, like a VHT single PPDU or a HE single PPDU, the ACK policy of a DATA PPDU transmitted on each subchannel is set uniformly to normal ACK and response frames for the DATA PPDUs are received as normal ACK PPDUs.

In the example of FIG. 16, data frames that the AP transmits to the plurality of STAs in a DL MU transmission may be regarded as trigger frames for ACK frames that the plurality of STAs transmit to the AP in a UL MU transmission. That is, the UL MU ACK frames may be transmitted based on information of the trigger frames for them (e.g., the ACK policies of the DL MU data frames).

As described above, a plurality of normal ACK frames transmitted simultaneously on a plurality of subchannels by a plurality of STAs may have the same property (e.g., the same length, transmission time, or type).

As in the example of FIG. 15 or FIG. 16, the same ACK policy should be set for ACKs transmitted by all STAs paired for MU-MIMO or OFDMA. For example, the ACK policy should be set so as to avoid the case where the ACK policy of a DATA PPDU transmitted on a subchannel is block ACK and the ACK policy of a DATA PPDU transmitted on another subchannel is normal ACK, and DATA PPDUs should be transmitted, which enable the same type of ACK policy across all subchannels (or for all STAs).

Figure 17:
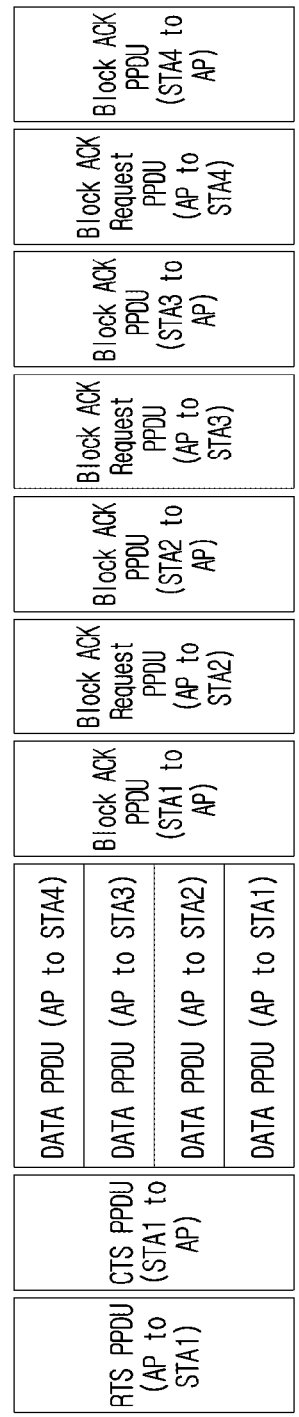
FIG. 17 depicts another exemplary ACK procedure performed in response to a DL MU transmission according to the present invention.

FIG. 17 depicts another exemplary ACK procedure performed in response to a DL MU transmission according to the present invention.

In FIG. 17, ACK frames transmitted in response to a DL MU transmission triggered by a trigger frame (i.e., a CTS frame) transmitted by an STA have the same property for a plurality of STAs.

FIG. 17 illustrates an exemplary ACK procedure in the case where DATA PPDUs having different ACK policies are transmitted in DL MU-MIMO or OFDMA. In the example of FIG. 17, the AP and STA1 exchange an RTS PPDU and a CTS PPDU with each other and the AP transmits DATA PPDUs in MU-MIMO or OFDMA to a plurality of STAs, as in the example of FIG. 15. Thus, a redundant description is avoided herein.

Among DATA PPDUs transmitted on a plurality of subchannels, the ACK policy of a DATA PPDU transmitted on a subchannel may be set to Implicit Block Ack Request, while the ACK policies of DATA PPDUs transmitted on the remaining subchannels may be set to block ACK. Therefore, the plurality of STAs, which have received data in DL MU-MIMO or OFDMA mode, may transmit ACKs to the AP sequentially in time.

For example, if the ACK policy of a DATA PPDU transmitted to STA1 on the first subchannel is Implicit Block Ack Request, STA1 may transmit a block ACK PPDU to the AP even though STA1 does not receive a block ACK request from the AP after receiving the DATA PPDU. Herein, STA1 may transmit the block ACK PPDU not on a subchannel but all subchannels including the subchannel (e.g., on one channel).

After receiving a block ACK request PPDU from the AP, the remaining STAs (i.e., STA2, STA3, and STA4) may transmit block ACK PPDUs to the AP accordingly. The block ACK request PPDU and the block ACK PPDUs may be transmitted not on subchannels in which related DATA PPDUs have been received but on all the subchannels including the subchannels (e.g., on the one channel).

The plurality of block ACK frames that the plurality of STAs transmit sequentially in time on one channel as described above may have the same property (e.g., the same length, transmission time, or type).

In the foregoing example of the present invention, an AP may transmit a DL MU frame to a plurality of STAs and receive UL ACK frames from the plurality of STAs in response to the DL MU frame. Since the transmission mode of the UL ACK frames is determined based on information provided by the DL MU frame, the AP may receive the UL ACK frames according to the transmission mode. In other words, if the AP transmits a DL MU data frame having the same ACK policy for all of the STAs, the AP may receive a UL MU ACK frame (e.g., the example of FIG. 15 or FIG. 16). If the AP transmits a DL MU data frame having different ACK policies for the plurality of STAs, the AP may receive UL SU ACK frames sequentially (e.g., the example of FIG. 17).

If an STA receives a DL MU data frame having DL data for the STA and DL data for one or more other STAs from the AP, the STA may determine the transmission mode of a UL ACK frame based on the DL MU data frame. That is, upon receipt of a DL MU data frame having the same ACK policy for all STAs, the STA may transmit its individual ACK frame simultaneously with individual ACK frames of one or more other STAs (e.g., the example of FIG. 15 or FIG. 16). On the other hand, upon receipt of a DL MU data frame having different ACK policies for the plurality of STAs, the STA may transmit a UL SU ACK frame at a transmission timing indicated by the AP (e.g., the example of FIG. 17).

According to the present invention, an MU-transmission receiver may determine a channel access operation depending on whether a reception error has occurred during an MU transmission. It may be determined based on a minimum MU transmission unit whether a reception error has occurred to an MU transmission related to a plurality of users. Specifically, if there is no reception error for at least one user of an MU transmission, it may be determined that the MU transmission is error-free. Or if there is no reception error for at least one subchannel of the MU transmission, it may be determined that the MU transmission is error-free. Inter-Frame Space (IFS) processing of channel access may be different depending on whether a reception error has occurred. The MU-transmission receiver may be an intended destination or a third-party STA. For example, in the case of a UL MU transmission, the same channel access operation may be performed according to generation or non-generation of a reception error irrespective of whether the MU transmission receiver is an AP or a third-party STA.

Further, an MU transmission may be transmitted as a frame responding to a trigger frame. For example, a plurality of users may transmit UL OFDMA MPDUs or A-MPDUs in response to a trigger frame received from an AP. Upon successful receipt of an MU transmission from at least one user (i.e., without a reception error), the MU-transmission receiver (e.g., the AP) may determine that a frame exchange procedure initiated by the trigger frame is successful and the MU transmission is free of an error.

In the case where the AP multicasts/broadcasts a block ACK PPDU across total subchannels to a plurality of transmitting STAs as in the example of FIG. 14, block bitmaps for the respective transmitting STAs (e.g., STA1, STA2, STA3, and STA4) should be included in the block ACK PPDU. In addition, control information about each of the transmitting STAs (e.g., a Frame Control field, a QoS control field, a (HE variant) HT control field) may be included in the block ACK PPDU. The (HE variant) HT control field may be used for a data receiver to indicate most optimum transmission parameters (e.g., an MCS, the number of spatial streams, etc.) for the data receiver to a data transmitter (e.g., a source).

For example, if an STA operates in Power Save Mode (PSM) and then starts a Service Period (SP) by transmitting a trigger frame to the AP, an End Of Service Period (EOSP) subfield may be set to 1 in a QoS control field of the last frame transmitted by the AP in order to indicate the ending point of one or more frames transmitted to the STA by the AP. Upon receipt of the EOSP subfield, the STA may terminate the SP. If a plurality of transmitting STAs operate in the PSM and then start an SP by transmitting trigger frames in the example of FIG. 14, an EOSP subfield of a QoS control field of a frame transmitted by the AP may be signaled separately to each transmitting STA because the SP may end at different time points for the transmitting STAs. Further, one or more of a QoS control field, a Frame Control field, and an (HE variant) HT control field may be separately signaled to each data transmitting STA.

Meanwhile, if only one piece of control information (e.g., only one of a Frame Control field, a QoS control field, and a (HE variant) HT control field) is included in a block ACK PPDU, the control information may be applied commonly to the plurality of data transmitting STAs.

Figure 18:
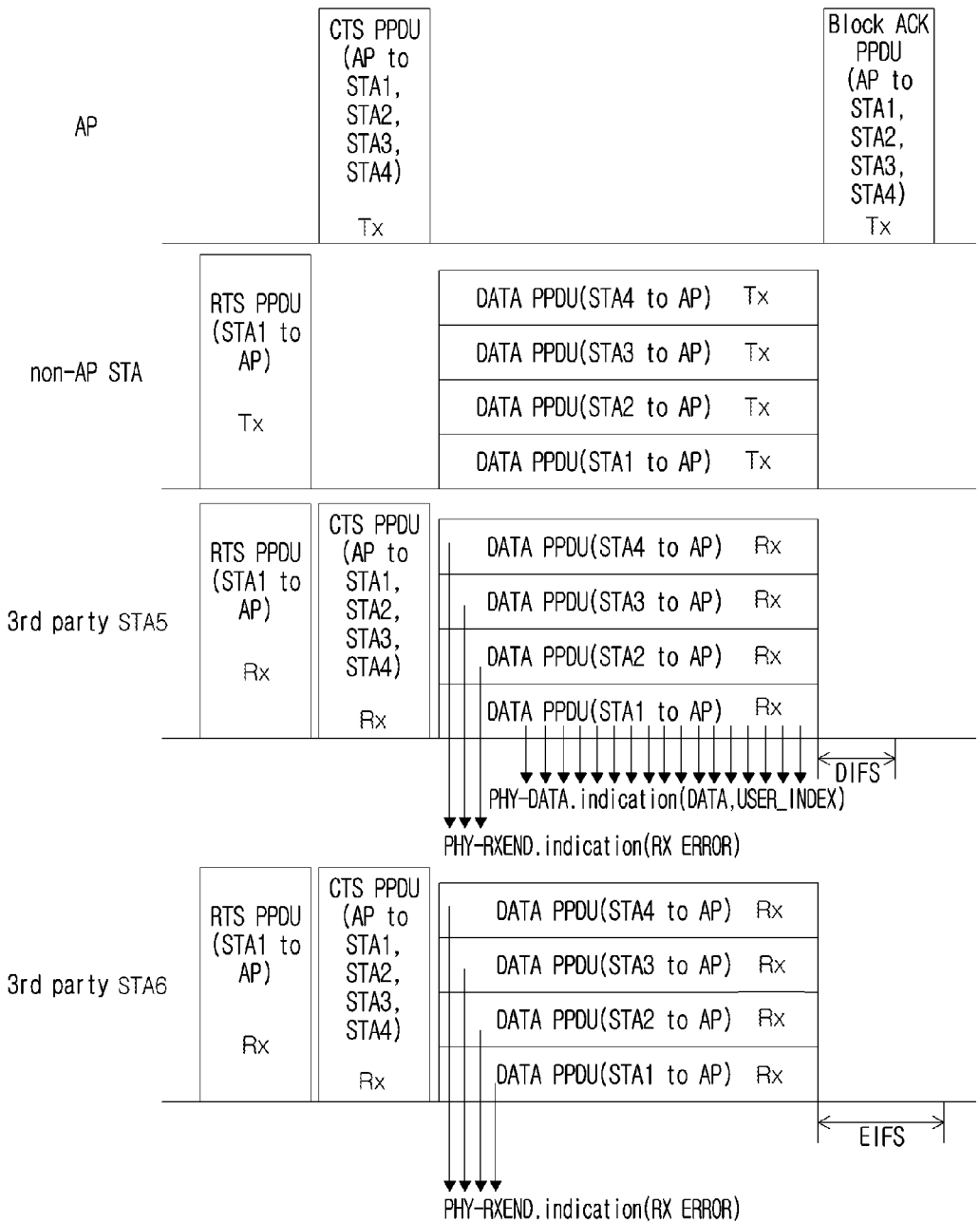
FIG. 18 depicts an operation for receiving an MU PPDU according to the present invention.

FIG. 18 depicts an operation for receiving an MU PPDU according to the present invention.

In the example of FIG. 18, a procedure in which an AP allocates subchannels to a plurality of STAs (e.g., STA1, STA2, STA3, and STA4) and the STAs simultaneously transmit PSDUs on the subchannels to the AP, and an operation of a third-party STA (i.e., an STA other than the STAs and the AP that exchange frames during a predetermined time period) are illustrated. In FIG. 18, non-AP STAs, STA1, STA2, STA3, and STA4 exchange frames with the AP, and third-party STA5 and third-party STA6 (i.e., STAs other than STA1 and STA2 that exchange frames with the AP) receive (i.e., overhear) the frames that the AP transmits or STA1, STA2, STA3, and STA4 transmit.

The third-party STAs may overhear all frames transmitted on a radio medium and perform virtual carrier sensing or physical carrier sensing. The virtual carrier sensing may include, for example, configuration of a Network Allocation Vector (NAC) based on a Duration field included in an overheard frame. The physical carrier sensing may include, for example, energy detection, preamble detection, and GI detection. These carrier sensing operations may be performed basically through primitives transmitted to the MAC layer by the PHY layer. For example, a timing at the MAC layer may be determined using primitives called PHY-TXEND.confirm, PHYTXSTART.confirm, PHY-RX-START.indication, and PHY-RXEND.indication as references.

Among them, an example of the present invention regarding the PHY-RXEND.indication primitive and the PHY-DATA.indication primitive which are related to channel access of third-party STAs will be described in detail.

The PHY-RXEND.indication primitive is indication information indicating completion of on-going PSDU reception to a local MAC entity by the PHY layer. This primitive provides the parameters illustrated in [Table 3] below.

TABLE 3

PHY-RXEND.indication(
RXERROR,
RXVECTOR
)

In [Table 3], the RXERROR parameter may provide one or more of values indicating NoError, FormatVioloation, CarrierLost, or UnsupportedRate. After a receive state machine at the PHY layer detects what seems to be a valid preamble and a Start Frame Delimiter (SFD), many error conditions may take place. Parameters returned for each of the error conditions are given as follows.

NoError. This value is used to indicate that no error has been generated in a PHY reception process.

Format Violation. This value is used to indicate the presence of an error in the format of a received PPDU.

CarrierLost. This value is used to indicate that PSDU processing may not be performed any longer because a carrier cannot be found during reception of an incoming PSDU.

UnsupportedRate. This value is used to indicate that an unsupported data rate has been detected during reception of an incoming PSDU.

Filtered. This value is used to indicate that a corresponding PPDU has been filtered out due to a condition set by PHYCONFIG_VECTOR during reception of an incoming PSDU In [Table 3], RXVECTOR indicates a list of parameters provided to the local MAC entity, when the PHY layer receives a valid PHY header or the last PSDU data bit of a received frame. RXVECTOR is a parameter included only when a dot1 1RadioMeasurementActivated parameter is set to true. RXVECTOR may include all of MAC parameters and MAC management parameters.

The PHY-RXEND.indication primitive may be generated to indicate to the local MAC entity that the PHY receive state machine has completed reception with or without an error. In the presence of Signal Extension, the PHY-RXEND.indication primitive may be generated at the termination point of a signal extension.

If the value of RXERROR is NoERROR, the MAC layer may use the PHY-RXEND.indication primitive as a reference for a channel access timing.

Upon receipt of the PHY-RXEND.indication primitive, the MAC layer may start IFS processing.

The IFS processing will be described. After receiving a frame for which a PHY-RXEND.indication primitive indicating an error is reported or a frame having a wrong MAC FCS value, a DCF uses an Extended IFS (EIFS) to determine whether a medium is idle before transmission. Likewise, an EDCA mechanism based on a Hybrid Coordination Function (HCF) of an STA may use an interval of EIFS-DIFS+AIFS[AC]. The EIFS or the EIFS-DIFS+AIFS[AC] interval starts after there is an indication indicating that the medium is idle irrespective of a virtual carrier sensing mechanism, after the PHY layer detects an erroneous frame. An STA does not start transmission before expiration of the later between a NAV and the EIFS or EIFS-DIFS+AIFS[AC]. The EIFS or EIFS-DIFS+AIFS[AC] is defined to provide a time sufficient for another STA to transmit an ACK in response to a frame. That is, because a frame for the other STA has been received wrongly on the part of the STA using the EIFS or EIFS-DIFS+AIFS[AC], it may be said that the STA waits for a time enough for another STA to transmit an ACK before the STA starts its transmission. Upon receipt of an error-free frame during the EIFS or EIFS-DIFS+AIFS [AC], the medium is resynchronized to a busy or idle state and thus the EIFS or EIFS-DIFS+AIFS[AC] is terminated. After receiving the corresponding frame, the STA may resume medium access (using an appropriate one between a DIFS and an AIFS and when needed, by backoff). Upon expiration or termination of the EIFS or EIFS-DIFS+AIFS [AC], the STA may control medium access by using a NAV and physical carrier sensing.

The PHY-DATA.indication primitive indicates data transfer from the PHY layer to the local MAC entity. This primitive provides the parameters listed in [Table 4] below.

TABLE 4

PHY-DATA.indication(
DATA
USER_INDEX
)

In [Table 4], the DATA parameter is an octet having a value ranging from X'00' to X'FF'.

In [Table 4], the USER INDEX parameter may be typically set to u for a HE STA. The USER_INDEX parameter exists for an MU PPDU (e.g., HE UPLINK OFDMA PPDU, HE DOWNLINK OFDMA PPDU, HE UPLINK MU PPDU, or HE DOWNLINK MU PPDU), indicating the index of a user in RXVECTOR to which the DATA octet is applied. Otherwise, USER_INDEX may not be included.

The PHY-DATA.indication primitive may be generated for a receiving PHY entity to transmit an octet of received data to the local MAC entity. The time between a reception time of the last bit of the last octet provided on a radio medium and a reception time of the PHY-DATA.indication primitive at the MAC entity may correspond to a delay time for processing at the PHY layer, expressed as aRxPHYDelay.

A channel access procedure of third-party STAs in the example of FIG. 18 will be described based on the aforedescribed PHY-RXEND.indication primitive and PHY-DATA. indication primitive.

As in the example of FIG. 14, STA1 transmits an RTS PPDU to the AP, the AP transmits a CTS PPDU including a list of STA1, STA2, STA3, and STA4, each STA transmits a DATA PPDU on its allocated subchannel in MU-MIMO or OFDMA, and the AP transmits a block ACK PPDU to STA1, STA2, STA3, and STA4 across total subchannels (i.e., on one channel) in the example of FIG. 18. Thus, a redundant description is not provided herein Since third-party STA5 has not received the PLCP headers of DATA PPDUs successfully from STA2, STA3, and STA4 (i.e., in view of a reception error), third-party STA1 may notify the MAC layer of error generation by setting the status information of RXERROR to indicate error generation in the PHY-RXEND.indication primitive (for example, by setting a value other than NoError. Meanwhile, as third-party STA5 successfully receives a DATA PPDU from STA1 (i.e., STA1 being one of the non-AP STAs in FIG. 18), third-party STA1 may set USER_INDEX to a value indicating STA1 (i.e., STA1 being one of the non-AP STAs in FIG. 18) in a PHY-DATA.indication primitive and transmit octet information of the received PSDU to the MAC layer. Subsequently, after transmission of the PPDU is completed, third-party STA5 may perform IFS processing by setting an IFS for the next channel access to the DIFS.

In a legacy WLAN (e.g., a system conforming to a standard such as IEEE 802.11 b/g/n/ac/ad/af/ah), if the PHY layer reports a PHY-RXEND.indication primitive with status information of RXERROR to a value indicating error generation (e.g., a value other than NoError), the IFS is set to an EIFS, for the next channel access. Compared to this operation of the legacy STA, third-party STA5 may attempt the next channel access based on the DIFS, instead of the EIFS in the present invention.

This is because although third-party STA5 has failed to receive the PLCP headers of DATA PPDUs from STA2, STA3, and STA4 and thus reports a PHY-RXEND.indication primitive with RXERROR set to a value indicating error generation to the MAC layer, third-party STA1 has successfully received a DATA PPDU from STA1 and may perform virtual carrier sensing by normally setting a NAV based on the received DATA PPDU.

If third-party STA5 has received the DATA PPDU from STA1 with an error, third-party STA5 may use the EIFS when attempting the next channel access (this may correspond to an operation of third-party STA6 described later in the example of FIG. 18).

That is, when a legacy STA successfully receives a frame without an error (e.g., the PHY-RXEND.indication primitive does not indicate error generation), the legacy STA uses the DIFS. On the other hand, when the legacy STA fails to receive a frame (e.g., the PHY-RXEND.indication primitive indicates error generation), the legacy STA uses the EIFS. However, even though a reception error occurs in a frame on some subchannel, as far as an STA successfully receives a frame without an error on at least one subchannel, the STA may use the DIFS instead of the EIFS in the present invention.

As third-party STA5 fails to receive the PLCP headers of DATA PPDUs from STA1, STA2, STA3, and STA4 (i.e., due to a reception error), third-party STA1 may transmit a PHY-RXEND.indication primitive with status information of RXERROR set to a value indicating error generation (e.g., a value other than NoError) to the MAC layer. Then, after transmission of the PPDUs is completed, third-party STA6 may perform IFS processing by setting the IFS for the next channel access to the EIFS.

That is, if error generation is reported for all users (or all subchannels) by status information of RXERROR of a PHY-RXEND.indication primitive for a frame received at a third-party STA, the third-party STA may attempt the next channel access procedure using the EIFS.

According to an embodiment of the present invention, in order to support the above operation, subchannel identification information or user identification information (e.g., USER_INDEX) is added to the RXVECTOR parameter of the PHY-RXEND.indication reported to the MAC layer by the PHY layer. Thus, the MAC layer may determine from the PHY-RXEND.indication primitive reported by the PHY layer whether there are errors for all users (or all subchannels). In the absence of an error for at least one user (or at least one subchannel), the DIFS is set for the next medium access. In the presence of errors for all users (or all subchannels), the EIFS may be set for the next medium access.

While a channel access procedure of third-party STAs is shown in FIG. 18 as performed based on the PHY-RXEND.indication primitive and the PHY-DATA.indication primitive, the same channel access scheme may also be performed for a destination STA of a HE MU PPDU frame (i.e., not an overhearing third-party STA but an intended receiving STA).

For example, it is assumed that a destination STA of HE MU PPDUs transmitted by STA1, STA2, STA3, and STA4 is an AP.

As the AP fails to receive the PLCP headers of DATA PPDUs from STA2, STA3, and STA4, the AP may provide a PHY-RXEND.indication primitive with status information of RXERROR set to a value indicating error generation (e.g., a value other than NoError) to the MAC layer. On the other hand, as the AP successfully receives a PSDU of a DATA PPDU from STA1, the AP may set USER INDEX of a PHY-DATA.indication primitive to STA1 and provide octet information of the PSDU to the MAC layer. Then, after transmission of the PPDU is completed, the AP may set the IFS to the DIFS, for the next channel access.

Meanwhile, as the AP fails to receive the PLCP headers of the DATA PPDUs from STA2, STA3, and STA4, the AP may provide the PHY-RXEND.indication primitive with status information of RXERROR set to a value indicating error generation (e.g., a value other than NoError) to the MAC layer. Then, after transmission of the PPDUs is completed, the AP may set the IFS to the EIFS, for the next channel access.

As described above, information such as USER_INDEX (i.e., a parameter indicating whether a reception error has occurred for each subchannel or each user) may be added to the PHY-RXEND.indication primitive in an embodiment of the present invention. Therefore, if a data frame is successfully received from at least one STA (or on at least one subchannel) among data frames (e.g., HE MU PPDU frames) transmitted simultaneously by a plurality of STAs, it may be determined that data frames have been successfully received from all users (or on all subchannels) and an IFS value may be set (e.g., to the DIFS), for the next channel access. If none of the data frames have been received successfully from all STAs (or on all subchannels), an IFS value is set (e.g., to the EIFS) for the next channel access, as in the case of a frame reception error.

Figure 19:
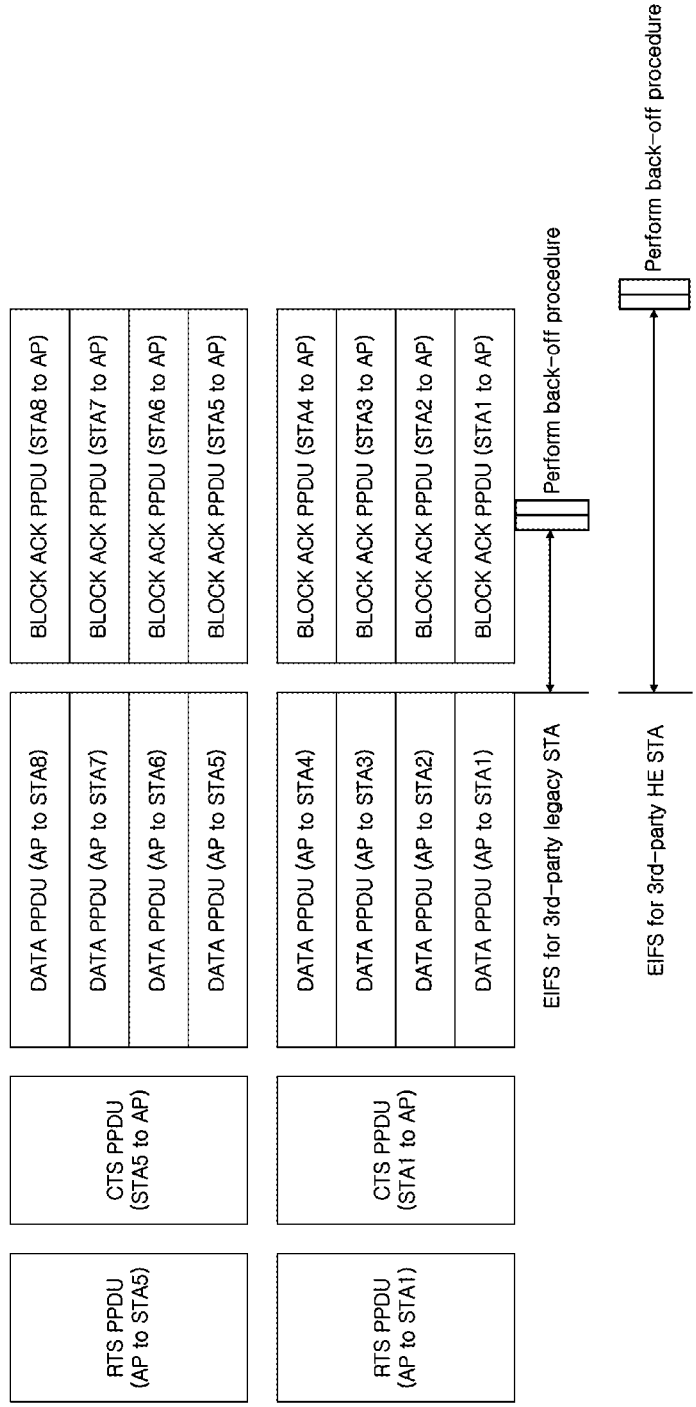
FIGS. 19 and 20 depict a method for determining an Extended Inter-Frame Space (EIFS) based on a transmission bandwidth according to the present invention.
Figure 20:
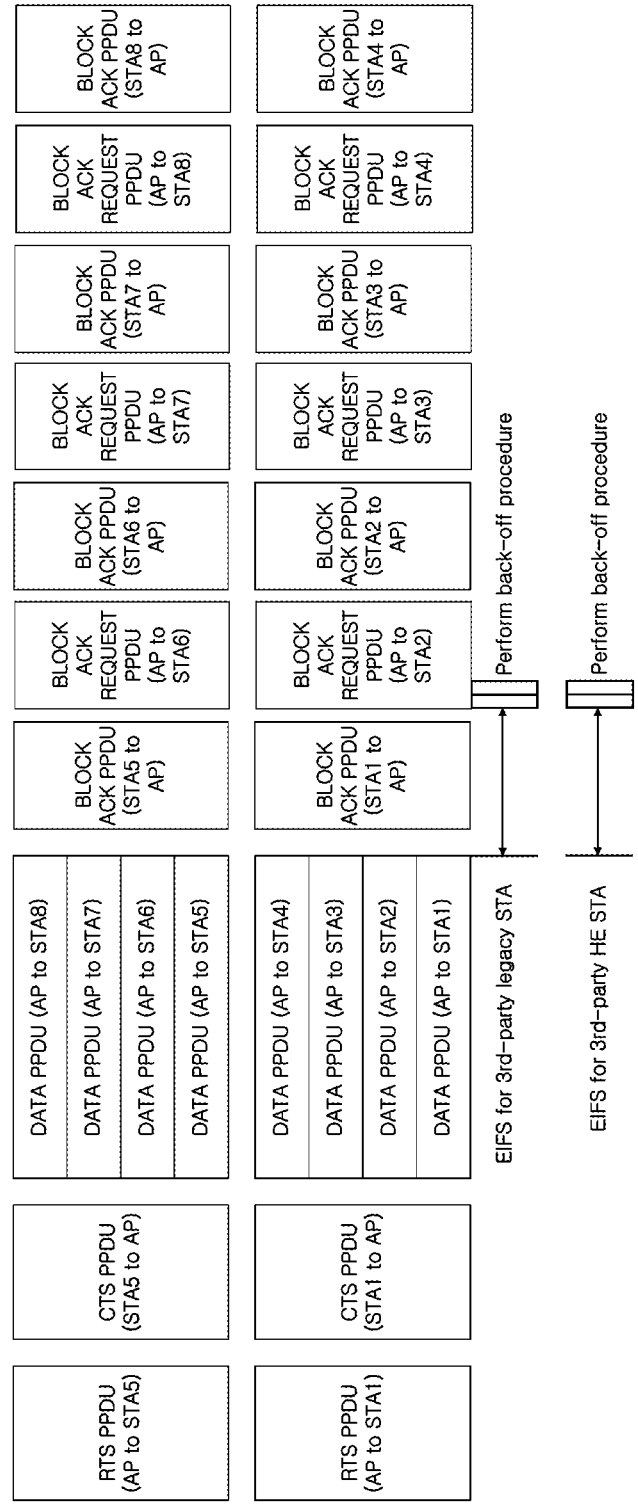

FIGS. 19 and 20 depict a method for determining an EIFS based on a transmission bandwidth according to the present invention.

In general, an EIFS may be calculated by [Equation 1].

$$\text{EIFS}=a\text{SIFSTime}+\text{ACK}T x\text{Time}+\text{DIFS} \quad \text{[Equation 1]}$$

In [Equation 1], aSIFSTime may be the sum of a nominal time taken to transmit the last bit of a frame received after the last symbol of a PPDU is received at the PHY layer (e.g., aRxRFDelay+aRxPLCPDelay, or aRxPHYDelay), a maximum available time for the MAC layer to process a transmission start request of the PHY layer, when the MAC layer receives information indicating that reception has been terminated or a medium is idle from the PHY layer (e.g., aMACProcessingDelay), and a maximum time required for the PHY layer to switch from a reception operation to a transmission operation (e.g., aRxTxTurnaroundTime).

ACKTxTime is represented as a time (in micro seconds) required for transmission of an ACK frame including a preamble, a PLCP header, and additional PHY-dependent information at a lowest PHY mandatory rate.

A DIFS may be calculated by [Equation 2].

$$\text{DIFS}=a\text{SIFSTime}+2*a\text{SlotTime} \quad \text{[Equation 2]}$$

In [Equation 2], aSlotTime is a value that may be changed dynamically according to a change of aAirPropagationTime. aSlotTime may be the sum of a maximum time available to a CCA mechanism to determine whether a medium is busy or idle in each time slot (e.g., aCCATime), the maximum time required for the PHY layer to switch from a reception operation to a transmission operation (e.g., aRxTxTurnaroundTime), double a signal propagation time between slot-synchronized STAs within a maximum allowed distance (e.g., aAirPropagationTime), and the maximum available time for the MAC layer to process a transmission start request of the PHY layer, when the MAC layer receives information indicating that reception has been terminated or a medium is idle from the PHY layer (e.g., aMACProcessingDelay).

Meanwhile, dynamic EIFS is a scheme for determining an EIFS based on an estimated time length (i.e., duration) of an expected response frame for an EIFS-causing PPDU.

The afore-described general EIFS is applicable to a case where the dynamic EIFS is not enabled (e.g., a dot11DynamicEIFSActivated parameter is set to FALSE) or not defined.

If the dynamic EIFS is enabled (e.g., the dot11DynamicEIFSActivated parameter is set to TRUE), an EIFS may be based on an estimated duration of a PPDU that may be transmitted in response to an EIFS-causing PPDU.

First of all, if the dynamic EIFS is enabled (e.g., the dot11DynamicEIFSActivated parameter is set to TRUE) and an EIFS-causing PPDU includes a single MPDU of a length of 14 or 32 octets, the EIFS may be determined to be equal to a DIFS. Herein, if the EIFS-causing PPDU includes a single MPDU of a length of 14 or 32 octets, it may be expected that the EIFS-causing PPDU is an ACK frame or a block ACK frame. In this case, since it may be expected that a PPDU is not transmitted in response to the EIFS-causing PPDU, an estimated ACK transmission time may not be included, when the EIFS is determined.

If the dynamic EIFS is enabled (e.g., the dot11DynamicEIFSActivated parameter is set to TRUE) and an EIFS-causing PPDU does not include a single MPDU of a length of 14 or 32 octets (or if it is expected that the EIFS-causing PPDU is not an ACK frame or a block ACK frame), the EIFS may be calculated by [Equation 3].

$$EIFS = aSIFSTime + EstimatedACKTxTime + DIFS \quad \text{[Equation 3]}$$

In [Equation 3], EstimatedACKTxTime may be based on an estimated duration of a PPDU that may be transmitted in response to an EIFS-causing PPDU. For example, EstimatedACKTxTime may be given as illustrated in [Table 5] below.

a second frame) transmitted in response to an EIFS-causing PPDU (e.g., a first frame). Compared to (or in addition to) a legacy dynamic EIFS scheme in which an estimated time length (i.e., duration) of a second frame transmitted in response to a first frame is considered based on RXVECTOR information (e.g., an MCS, rate information, etc.) about the first frame, the information about the estimated transmission bandwidth of the second frame transmitted in response to the first frame may be considered in the embodiment of the present invention.

Herein, if a plurality of subchannels are not allocated in one channel (e.g., a channel defined in units of a bandwidth of 20 MHz, 40 MHz, 80 MHz, or 160 MHz), the transmission bandwidth may be the bandwidth of the channel. If a plurality of subchannels are allocated in one channel, the transmission bandwidth may be the bandwidth of one subchannel.

The example of FIG. 19 depicts a case in which the second frame is transmitted on a subchannel (i.e., a smaller allocation unit than the channel bandwidth) in response to the first frame.

In the example of FIG. 19, upon expiration of a backoff timer, an AP may transmit an RTS PPDU to a destination STA (e.g., STA1 or STA5) on each of a plurality of channels according to an EDCA protocol. Upon receipt of the RTS PPDU on one channel, the destination STA (e.g., STA1 or STA5) may transmit a CTS PPDU to the AP on the channel. Upon receipt of the CTS PPDU on one channel, the AP may allocate subchannels to a plurality of STAs within the channel and transmit PSDUs to the STAs on the subchannels simultaneously. FIG. 19 illustrates an example of allocating four subchannels in each of two channels. The plurality of STAs allocated to the subchannels may include other STAs (e.g., STA2, STA3, STA4, STA6, STA7, and STA8) in addition to the destination STAs (e.g., STA1 and STA5) that have exchanged the RTS/CTS.

Upon receipt of a DATA PPDU on a subchannel allocated by the AP, an STA may transmit a block ACK PPDU to the AP on the subchannel. Since a plurality of STAs transmit block ACK PPDUs on their allocated subchannels within one channel, it may be said that the plurality of block ACK PPDUs (or a UL OFDMA frame) are transmitted simultaneously from the plurality of STAs. While not shown in FIG.

TABLE 5

| Modulation of EIFS-causing PPDU | Rate/MCS of EIFS-causing PPDU | Other characteristics of EIFS-causing PPDU | Expected response | Rate of expected response | Estimated AckTxTime (µs) |
|---|---|---|---|---|---|
| (HR)-DSSS | 1 Mbps | | Ack | 1 Mbps | 304 |
| (HR)-DSSS | ≥2 Mbps (long preamble) | | Ack | 2 Mbps | 248 |
| (HR)-DSSS | ≥2 Mbps (long preamble) | | Ack | 2 Mbps | 152 |
| (ERP)-OFDM | BPSK | | Ack | 6 Mbps | 44 |
| (ERP)-OFDM | QPSK | | Ack | 12 Mbps | 32 |
| (ERP)-OFDM | ≥16-QAM | | Ack | 24 Mbps | 28 |
| HT | BPSK | Aggregation = 0 | Ack | 6 Mbps | 44 |
| HT | QPSK | Aggregation = 0 | Ack | 12 Mbps | 32 |
| HT | ≥16-QAM | Aggregation = 0 | Ack | 24 Mbps | 28 |
| HT | BPSK | Aggregation = 1 | Block Ack | 6 Mbps | 68 |
| HT | QPSK | Aggregation = 1 | Block Ack | 12 Mbps | 44 |
| HT | ≥16-QAM | Aggregation = 1 | Block Ack | 24 Mbps | 32 |

According to an embodiment of the present invention, a variable EIFS may be determined based on information about an estimated transmission bandwidth of a frame (e.g., 19, normal ACK PPDUs may be transmitted simultaneously from the plurality of STAs, instead of the block ACK PPDUs. For an operation for transmitting and receiving an RTS, a CTS, a DATA PPDU, a block ACK PPDU (or a normal ACK PPDU) on one channel, the description of FIG. 15 or FIG. 16 may be referred to.

If third-party STAs receive DATA PPDUs that the AP simultaneously transmits to STA1 to STA8, the third-party STAs may use EIFS values to determine whether a medium is idle prior to transmission because the received PPDUs are not destined for the third-party STAs which are not destination STAs (e.g., because a frame for which a PHY-RXEND.indication primitive indicating an error is reported or a frame with a MAC FCS set to FALSE has been received).

In the example of FIG. 19, the third-party STAs are a HE STA (i.e., an STA that determines an EIFS based on a transmission bandwidth according to the embodiment of the present invention) and a legacy STA (i.e., an STA without the capability of determining an EIFS based on a transmission bandwidth).

Upon receipt of the first frame (i.e., an EIFS-causing frame, that is, the DATA PPDUs transmitted simultaneously to STA1 to STA8 in the example of FIG. 19), the third-party legacy STAs may determine EIFS values by determining ACKTxTime or EstimatedACKTxTime in the conventional manner (i.e., without taking into account the transmission bandwidth of the second frame (an ACK frame transmitted simultaneously by each of STA1 to STA8) transmitted in response to the first frame, or considering that the transmission bandwidth of the second frame is equal to a channel bandwidth).

If the second frame is transmitted in a smaller transmission bandwidth than the channel bandwidth (i.e., in a subchannel bandwidth) in response to the first frame, it has an increased OFDM symbol duration relative to a PPDU frame transmitted in the channel bandwidth. In other words, since a smaller FFT size or a smaller number of data tones are applied to a subchannel unit than to a channel unit, the duration of an OFDM symbol transmitted in the subchannel unit is increased, relative to the duration of an OFDM symbol transmitted in the channel unit. For example, the duration of an OFDM symbol on a 5-MHz subchannel may be four times as long as the duration of an OFDM symbol on a 20-MHz channel. As a consequence, the transmission time of ACK frames transmitted simultaneously by a plurality of STAs is increased.

However, because the third-party legacy STA cannot expect the second frame in such a subchannel unit, the third-party legacy STA uses a smaller EIFS value than an EIFS value determined by the third-party HE STA.

Meanwhile, if the third-party HE STA expects that the second frame is transmitted in a smaller transmission bandwidth (e.g., in a subchannel bandwidth) than the channel bandwidth in response to the first frame, the third-party HE STA may determine accordingly that ACKTxTime or EstimatedACKTxTime will be further increased in the EIFS calculation equation. Thus, the EIFS determined by the third-party HE STA is larger than the EIFS determined by the third-party legacy STA.

Compared to (or in addition to) an EstimatedACKTxTime value that is dynamically determined in consideration of RXVECTOR information (e.g., the rate of an expected response, etc.) as illustrated in [Table 5], additional variability is given to an EIFS by ACKTxTime or EstimatedACKTxTime determined based on the transmission bandwidth of the second frame.

Upon receipt of a plurality of data units directed to a plurality of STAs on a plurality of subchannels in this manner, a HE STA may determine an EIFS in consideration of a plurality of response frames transmitted in response to the plurality of data units. Herein, the HE STA may determine the EIFS, taking into account the bandwidths of the plurality of response frames (subchannel sizes). More specifically, the HE STA may determine the EIFS in consideration of the bandwidth, MCS, and BA or non-BA of each of the plurality of response frames. In an embodiment, the HE STA may estimate a plurality of response rates for the plurality of response frames in consideration of the bandwidth, MCS, and BA or non-BA of each of the response frames, determine EstimatedAckTxTime based on the minimum of the plurality of estimated response rates, and determine an EIFS based on the determined EstimatedAck-TxTime.

In an embodiment, the HE STA may estimate a response rate in consideration of the minimum of the bandwidths of the plurality of response frames and an MCS and BA or non-BA for the minimum bandwidth, determine EstimatedAckTxTime based on the estimated response rate, and determine an EIFS based on the determined EstimatedAck-TxTime.

FIG. 20 depicts an example of transmitting a second frame on a channel (i.e., in an allocation unit equivalent to a channel bandwidth) in response to a first frame.

An RTS, a CTS, and DATA PPDUs are exchanged between an AP and a plurality of STAs in FIG. 20 in the same manner as in the example of FIG. 19 and thus a redundant description will be avoided herein. Upon receipt of a DATA PPDU on a subchannel allocated by the AP, an STA may transmit a block ACK PPDU to the AP on a channel to which the subchannel belongs. Upon receipt of DATA PPDUs on one same channel at the same time, a plurality of STAs may transmit block ACK PPDUs on the channel to the AP, sequentially in time. For an operation for transmitting and receiving an RTS, a CTS, DATA PPDUs, block ACK PPDUs, and a block ACK request PPDU on one channel, refer to the description of FIG. 17.

In the example of FIG. 20, a third-party legacy STA and a third-party HE STA, which are not destination STAs, set the same EIFS.

Upon receipt of the first frame (i.e., an EIFS-causing PPDU, that is, a DATA PPDU transmitted simultaneously by each of STA1 to STA8 in FIG. 19), the third-party legacy STA may determine an EIFS by determining ACKTxTime or EstimatedACKTxTime in the conventional manner (i.e., without taking into account the transmission bandwidth of the second frame (an ACK frame transmitted by STA1) transmitted in response to the first frame, or considering that the transmission bandwidth of the second frame is equal to the channel bandwidth).

If the second frame is transmitted in a transmission bandwidth equal to or larger than the channel bandwidth in response to the first frame, the OFDM symbol duration of the second frame is not increased relative to a PPDU frame transmitted in the channel bandwidth. As a consequence, the transmission time of a block ACK PPDU transmitted by a single STA is not increased.

Therefore, if the third-party HE STA expects that the second frame is transmitted in a transmission bandwidth equal to or larger than the channel bandwidth (e.g., in the channel bandwidth) in response to the first frame, the third-party HE STA may determine accordingly that ACK-TxTime or EstimatedACKTxTime is not increased in the EIFS calculation equation. Thus, the EIFS determined by the third-party HE STA may be equal to the EIFS determined by the third-party legacy STA.

The method for determining an EIFS based on a transmission bandwidth, which has been described with reference to the examples of FIGS. 19 and 20, may be based on how to determine the transmission bandwidth of a second frame (i.e., an ACK frame) transmitted in response to a first frame (i.e., an EIFS-causing HE PPDU frame) transmitted in MU mode in a channel bandwidth equal to or larger than 20 MHz (e.g., 20 MHz, 40 MHz, 80 MHz, or 160 MHz).

If it is expected that the transmission bandwidth of the second frame is a first bandwidth, an EIFS (or a factor determining the EIFS, ACKTxTime or EstimatedACKTx-Time) may be determined to be larger than if it is expected that the transmission bandwidth of the second frame is a second bandwidth (herein, the first bandwidth<the second bandwidth, or the first bandwidth<the bandwidth of an RTS/CTS).

In an embodiment, an EIFS may be determined based on whether a response frame is transmitted in a bandwidth equal to the bandwidth of an RTS/CTS. The EIFS may be larger when the response frame is transmitted in a smaller bandwidth than the transmission bandwidth of the RTS/CTS than when the response frame is transmitted in a bandwidth equal to the transmission bandwidth of the RTS/CTS. In an embodiment, the EIFS may be determined based on whether a response frame is transmitted in the OFDMA mode. The EIFS may be larger when the response frame is transmitted in the OFDMA mode than when the response frame is transmitted in the non-OFDMA mode.

Figure 21:
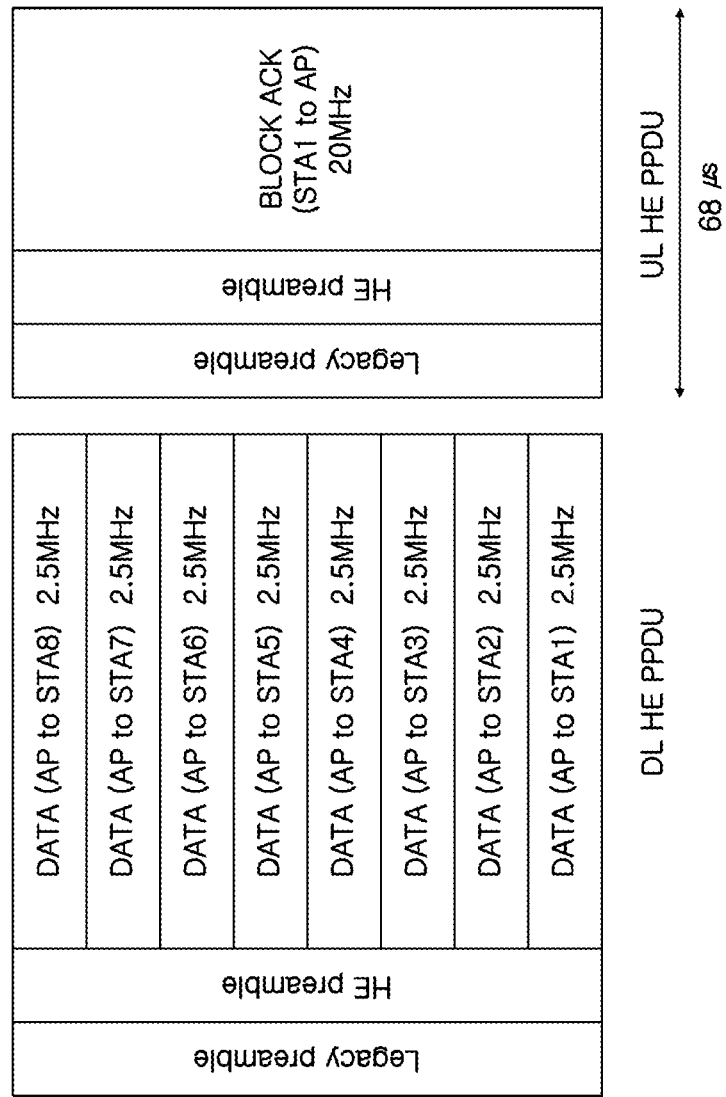
FIGS. 21 and 22 depict a method for determining an ACK frame transmission time based on a transmission bandwidth according to the present invention.
Figure 22:
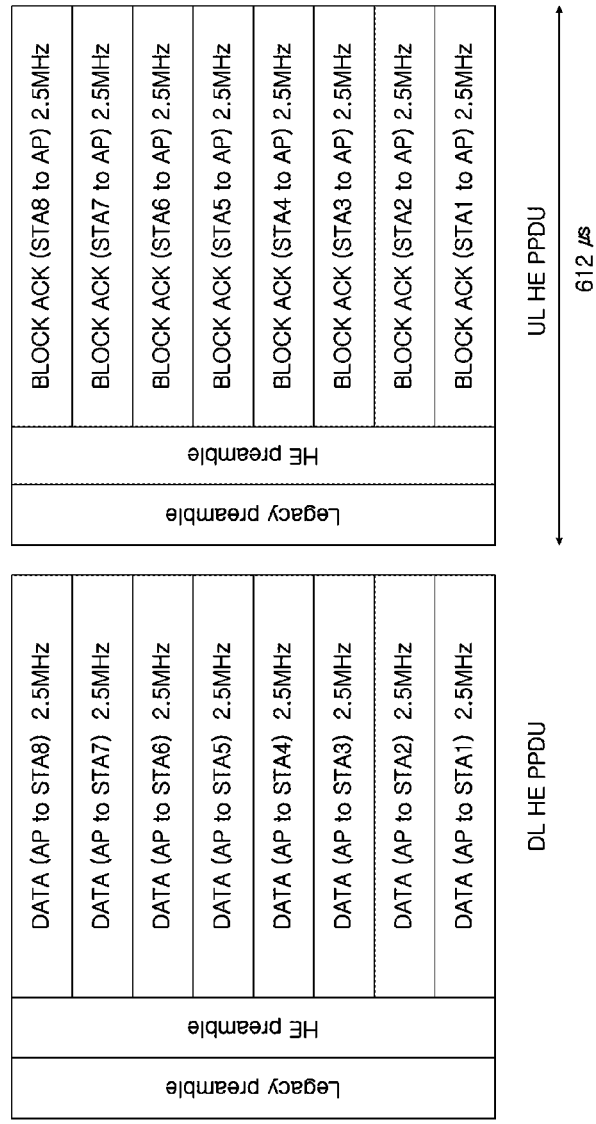

FIGS. 21 and 22 depict a method for determining an ACK frame transmission time based on a transmission bandwidth according to the present invention.

FIGS. 21 and 22 illustrate specific exemplary ACK transmission times (e.g., ACKTxTime) by which to determine an EIFS in DL and UL MU frame exchange sequences.

In FIG. 21, an AP may transmit a DL OFDMA PPDU frame to a plurality of STAs. The DL OFDMA PPDU frame may be configured in a HE PPDU frame format (e.g., a frame format including one or more of L-STF, L-LTF, L-SIG, and HE-SIG-A fields on one channel, one or more of HE-STF, HE-LTF, HE-SIG-B, and HE-SIG-C on each of a plurality of subchannels, and a PSDU on each of the plurality of subchannels). If the DL OFDMA PPDU has a channel bandwidth of 20 MHz in FIG. 21, each of eight subchannels may have a bandwidth of 2.5 MHz. One (e.g., STA1) of destination STAs may transmit a control response frame (e.g., a block ACK frame) in the HE PPDU format an SIFS after receiving the DL OFDMA PPDU. If one response frame occupies the channel bandwidth of 20 MHz, the ACK frame transmission time (i.e., ACKTxTime) may be 68 µs.

An AP transmits a DL OFDMA PPDU frame to a plurality of STAs in the example of FIG. 22, as in the example of FIG. 21. The plurality of destination STAs (i.e., STA1 to STA8) may transmit control response frames (e.g., block ACK frames) in the HE PPDU format an SIFS after receiving the DL OFDMA PPDU. If a response frame from each STA occupies a transmission bandwidth of 2.5 MHz (i.e., a subchannel bandwidth), the transmission time (i.e., ACK-TxTime) of ACK frames transmitted simultaneously by the plurality of STAs may be 612 µs.

As described above, an ACK frame transmission time varies with the transmission bandwidth of an ACK frame. Accordingly, upon receipt of an MU-transmitted data frame (i.e., a first frame), a destination STA transmits a response frame (i.e., a second frame), whereas upon receipt of the MU-transmitted data frame (i.e., the first frame), a third-party STA which is not a destination STA determines whether a medium is idle by performing carrier sensing using an EIFS. The third-party STA may determine a variable EIFS based on the transmission bandwidth of the response frame (i.e. the second frame) transmitted in response to the first frame.

If the second frame (i.e., the control response frame transmitted in response to the first frame) uses the same transmission bandwidth as the first frame (i.e., the EIFS-causing frame), the transmission bandwidth of the second frame may be implicitly determined based on the subchannel allocation structure of the first frame.

Further, the HE preamble (e.g., HE-SIG-A or HE-SIG-B) of the first frame may carry information about the transmission bandwidth of the second frame. For example, if one or more second frames are transmitted simultaneously in different transmission bandwidths, information about the minimum of the transmission bandwidths of the second frames may be included in the HE preamble of the first frame.

In addition, the information about the transmission bandwidth of the second frame (e.g., the information indicated by the HE preamble of the first frame) may be replaced with transmission time information that varies with the transmission bandwidth information. Compared to the above scheme for providing information about the transmission bandwidth of a second frame and determining information about a transmission time of the second frame based on the transmission bandwidth information, this scheme more directly provides the transmission time information about the second frame.

As described above, a third-party STA, which is not a destination STA of the first frame, may estimate information about the transmission bandwidth of the second frame from specific information included in the received first frame. Accordingly, the third-party STA may determine a variable EIFS based on the transmission bandwidth of the second frame.

In the case where the dynamic EIFS is enabled (e.g., the dot11DynamicEIFSActivated parameter is set to TRUE), if a first frame (i.e., an EIFS-causing PPDU) includes a single MPDU and the LENGTH field of the L-SIG field in the PHY header of the single MPDU indicates 14 or 32 octets, or if the first frame includes a VHT/HE single MPDU and the MPDU LENGTH field of the MPDU delimiter of an A-MPDU subframe in the VHT/HE single MPDU indicates 14 or 32 octets, an EIFS may be determined to be equal to a DIFS. This is because the single MPDU having a length of 14 or 32 octets is highly likely to be an ACK frame or a block ACK frame and no response frame is transmitted in response to the ACK frame or the block ACK frame.

A VHT/HE single MPDU is the only MPDU in an A-MPDU transmitted in a VHT PPDU or HE PPDU. The VHT/HE single MPDU corresponds to an MPDU transmitted in an A-MPDU subframe, with the EOF subfield of the delimiter set to 1.

The method for determining an EIFS based on the transmission bandwidth of a response frame (i.e., a second frame) transmitted in response to a HE PPDU data frame (i.e., a first frame) transmitted in an MU mode by an AP in a HE STA has been described with reference to the foregoing examples. Now, a description will be given of a method for determining a transmission bandwidth for a second frame, when a destination STA of a first frame transmits the second frame. The method for determining a transmission bandwidth for a second frame may be applied as a method for determining a transmission bandwidth for a second frame based on which a third-party STA receiving a first frame determines an EIFS.

Referring to FIG. 19 again, the third-party legacy STA may use a smaller EIFS value than the third-party HE STA. In this case, the third-party legacy STA may have a higher channel access probability than the third-party HE STA. That is, as illustrated in FIG. 19, since the third-party legacy STA may perform a backoff procedure earlier than the third-party HE STA and its backoff count may reach 0 earlier than the backoff count of the third-party HE STA despite a random backoff value, the third-party legacy STA is highly likely to acquire a channel access right. Therefore, although the EIFS of a third-party STA may be set variably in consideration of the transmission bandwidth of the second frame, the transmission bandwidth of the second frame may be set so that a legacy STA and a HE STA may set the same EIFS value in a specific situation, to thereby balance channel access probabilities between the legacy STA and the HE STA according to an embodiment of the present invention.

For example, if the transmission bandwidth of a first frame (e.g., a HE MU PPDU) is smaller than a channel bandwidth (e.g., 20 MHz), the transmission bandwidth of a second frame (e.g., a normal ACK frame or a block ACK frame) transmitted in response to the first frame may be larger than the transmission bandwidth of the first frame eliciting the second frame. For example, if an STA receives a HE MU PPDU including a PSDU transmitted in a transmission bandwidth smaller than 20 MHz, allocated to the STA (e.g., a transmission bandwidth corresponding to a 2.5-MHz subchannel), the transmission bandwidth of a block ACK frame or a normal ACK frame that the STA transmits in response to the HE MU PPDU may be equal to or larger than 2.5 MHz, or equal to or larger than the 20-MHz channel bandwidth.

Further, if the first frame (e.g., the HE MU PPDU) is transmitted on one or more channels (each having a bandwidth equal to or larger than 20 MHz), the ACK Policy field of the first frame for a plurality of STAs may be set in such a manner that only one STA or no STA (i.e., 0 or 1 STA) may transmit an immediate response frame (e.g., a block ACK frame or a normal ACK frame) in response to the first frame. For example, if the first frame is transmitted on a plurality of channels, the ACK Policy field may be set to Implicit Block Ack Request only for a DATA PPDU for one or no STA on one channel (or transmitted on a subchannel allocated to one STA), whereas the ACK Policy field may be set to block ACK for DATA PPDUs for the remaining STAs on the one channel. Therefore, if the first frame is transmitted on one or more channels, the second frame (or a block ACK or normal ACK frame) is allowed to be transmitted on each of the channels. As in the foregoing embodiment, the transmission bandwidth of the second frame transmitted on each channel may be set to be equal to or larger than the transmission bandwidth of the first frame.

In addition, one or more second frames (e.g., block ACK frames or normal ACK frames) may be transmitted simultaneously on one or more transmission channels (each transmission channel has a bandwidth equal to or larger than 20 MHz). Herein, the transmission channels carrying the second frames may include a primary channel. The primary channel is a common channel for all member STAs of a BSS. If a second frame is transmitted on a plurality of transmission channels, the plurality of transmission channels may be contiguous in the frequency domain. If a block ACK request PPDU frame requesting a block ACK PPDU frame is transmitted on one or more transmission channels, the transmission channels carrying the block ACK PPDU frame may include a primary channel. If a plurality of transmission channels are used, the transmission channels may be contiguous.

As described above, one or more channels (e.g., one or more 20-MHz channels) occupied by a first frame (e.g., a DL MU PPDU data frame, a frame eliciting a UL MU PPDU, a trigger frame, or a block ACK request frame) may include a primary channel. Further, one or more subchannels may be allocated in each of one or more transmission channels (e.g., one or more 20-MHz channels) occupied by the first frame. One or more subchannels may be allocated for transmission of a second frame in each of one or more transmission channels (e.g., one or more 20-MHz channels) occupied by the first frame. One or more subchannels allocated for transmission of a second frame in a transmission channel occupied by the first frame may be included in a primary channel.

Further, one or more transmission channels occupied by a second frame (e.g., a UL MU PPDU frame, a normal ACK frame, or a block ACK frame) elicited by a first frame may include a primacy channel. A UL subchannel (i.e., a subchannel for transmission of the second frame) may not be allocated in a transmission channel that is not occupied by the first frame.

FIG. 23 is a flowchart illustrating an exemplary method according to the present invention.

In step S2310, an STA may receive a first frame (e.g., a DL HE MU PPDU) including data for a plurality of STAs.

In step S2320, the STA may determine whether the received first frame has an error. The determination as to whether an error has occurred to the first frame may amount to determining whether the first frame is destined for the STA or any other STA.

In step S2330, if the first frame is free of an error (i.e., the STA is a destination STA of the received first frame), the STA may transmit a second frame including an ACK of the STA, simultaneously with ACKs of one or more other STAs. The second frame may be a block ACK frame or a UL OFDMA frame, and may be transmitted to an AP.

In step S2340, if the received first frame has an error (i.e., the STA is not a destination STA of the received first frame), the STA may expect that a second frame including multiplexed ACKs of a plurality of STAs except the STA will be transmitted. Accordingly, the STA may determine a variable IFS based on information about an estimated transmission bandwidth of the second frame to be transmitted (i.e., the bandwidth of one channel if it is expected that the second frame will be transmitted in non-OFDMA, and the bandwidth of one subchannel if it is expected that the second frame will be transmitted in OFDMA). For example, as the estimated transmission bandwidth of the second frame is larger, the variable IFS may be determined to be a smaller value, and as the estimated transmission bandwidth of the second frame is smaller, the variable IFS may be determined to be a larger value. The STA may determine whether a medium is idle by performing carrier sensing using the determined variable IFS.

The transmission bandwidth of the second frame may be indicated or estimated based on information included in the first frame or the subchannel allocation structure of the first frame. Further, the transmission bandwidth of the second frame may be set or estimated to be equal or larger than the transmission bandwidth of the first frame. An IFS (e.g., an EIFS) may be determined based on the estimated transmission bandwidth of the second frame.

While the exemplary method has been described with reference to FIG. 23 as a series of operations for simplicity of description, this does not limit the sequence of steps. When needed, steps may be performed at the same time or in a different sequence. All of the exemplary steps are not always necessary to implement the method according to the present invention.

The foregoing embodiments of the present invention may be implemented independently or one or more of the embodiments may be implemented simultaneously, for the method of FIG. 23.

The present invention includes an apparatus for processing or performing the method according to the present invention (e.g., the wireless device and its components described with reference to FIGS. 1, 2, and 3).

The present invention includes software (an operating system (OS), an application, firmware, a program, etc.) for executing the method according to the present invention in a device or a computer, and a medium storing the software that can be executed in a device or a computer.

While various embodiments of the present invention have been described in the context of an IEEE 802.11 system, they are applicable to various mobile communication systems.

What is claimed is:

1. A method for processing a received frame by a Station (STA) in a Wireless Local Area Network (WLAN), the method comprising:
receiving a first frame including a plurality of downlink data frames for a plurality of STAs, wherein the plurality of downlink data frames for the plurality of STAs are respectively included in a plurality of downlink subchannels in the first frame, wherein ACKnowledgment (ACK) policy fields of the plurality of downlink data frames are set to a same value, and wherein a plurality of 20-Megahertz transmission channels occupied by the first frame include a primary channel;
when no error occurs in the received first frame, transmitting a second frame including an ACK of the STA, the ACK of the STA being transmitted simultaneously with ACKs of one or more other STAs, wherein a plurality of uplink subchannels are allocated for transmitting the ACK of the STA and the ACKs of the one or more other STAs such that at least one subchannel is allocated for each of the plurality of 20-Megahertz transmission channels; and
when an error occurs in the received first frame, performing carrier sensing using a variably determined Inter-Frame Space (IFS),
wherein a bandwidths of an uplink subchannel allocated to the STA is larger than a bandwidth of a downlink subchannel allocated to the STA.

2. The method according to claim 1, wherein the IFS is variably determined based on an estimated transmission bandwidth of an expected second frame transmittable by the plurality of STAs without including the STA.

3. The method according to claim 2, wherein an IFS value for the estimated transmission bandwidth being a first bandwidth is different from an IFS value for the estimated transmission bandwidth being a second bandwidth different from the first bandwidth.

4. The method according to claim 2, wherein an IFS value for the estimated transmission bandwidth being a first bandwidth is larger than an IFS value for the estimated transmission bandwidth being a second bandwidth larger than the first bandwidth.

5. The method according to claim 2, wherein the IFS is an Extended IFS (EIFS) and the EIFS is calculated by summing a Short IFS (SIFS), an ACK transmission time, and a Distributed coordination function IFS (DIFS), and
wherein the ACK transmission time is variably determined based on the estimated transmission bandwidth.

6. The method according to claim 2, wherein if the second frame is an uplink Orthogonal Frequency Division Multiple Access (OFDMA) frame, the estimated transmission bandwidth is determined to be a minimum of the bandwidths of a plurality of subchannels.

7. The method according to claim 2, wherein if the second frame has the same transmission bandwidth as the first frame, the estimated transmission bandwidth is determined based on a subchannel allocation structure of the first frame.

8. The method according to claim 2, wherein the estimated transmission bandwidth is determined based on information included in a preamble of the first frame.

9. The method according to claim 2, wherein information included in a preamble of the first frame is information about a transmission bandwidth of the expected second frame or transmission time information determined based on the transmission bandwidth of the expected second frame.

10. The method according to claim 1, wherein the second frame is an uplink OFDMA frame including multiplexed ACKs of the plurality of STAs including the STA.

11. The method according to claim 1, wherein the second frame is a block ACK frame including multiplexed ACKs of the plurality of STAs.

12. The method according to claim 1, wherein if a primitive for indicating completion of reception of a data unit at a physical layer of the STA to a Medium Access Control (MAC) layer of the STA includes information indicating an occurrence of an error or a MAC Frame Check Sequence (FCS) value of the first frame is false, it is determined that the error occurs in the received first frame,
otherwise, it is determined that no error occurs in the received first frame.

13. The method according to claim 1, wherein the first frame is a trigger frame eliciting the second frame.

14. A method for transmitting a frame by an Access Point (AP) in a Wireless Local Area Network (WLAN), the method comprising:
transmitting a first frame for a plurality of Stations (STAs) on a plurality of 20-Megahertz transmission channels including a primary channel, the first frame including a plurality of downlink data frames for the plurality of STAs, wherein the plurality of downlink data frames for the plurality of STAs are respectively included in a plurality of downlink subchannels in the first frame, wherein ACK policy fields of the plurality of downlink data frames are set to the same, and wherein a plurality of 20-Megahertz transmission channels occupied by the first frame include a primary channel; and
simultaneously receiving ACKs from STAs, wherein a plurality of uplink subchannels are allocated for transmitting the ACKs such that at least one subchannel is allocated for each of the plurality of 20-megahertz transmission channels,
wherein a bandwidth of an uplink subchannel allocated to a first STA is larger than a bandwidth of a downlink subchannel allocated to the first STA.

* * * * *